US007920793B2

(12) United States Patent
Masuda et al.

(10) Patent No.: US 7,920,793 B2
(45) Date of Patent: Apr. 5, 2011

(54) INLINE REPEATER AND OPTICAL FIBER COMMUNICATION SYSTEM

(75) Inventors: Hiroji Masuda, Yokosuka (JP); Kenji Sato, Yokosuka (JP); Yutaka Miyamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 984 days.

(21) Appl. No.: 10/581,327

(22) PCT Filed: Jun. 17, 2005

(86) PCT No.: PCT/JP2005/011135
§ 371 (c)(1),
(2), (4) Date: Jun. 1, 2006

(87) PCT Pub. No.: WO2006/001229
PCT Pub. Date: Jan. 5, 2006

(65) Prior Publication Data
US 2008/0193136 A1 Aug. 14, 2008

(30) Foreign Application Priority Data

Jun. 23, 2004 (JP) .............................. P 2004-184601
Oct. 5, 2004 (JP) .............................. P 2004-292377

(51) Int. Cl.
*H04J 14/02* (2006.01)
(52) U.S. Cl. ................ 398/92; 398/95; 398/81; 398/79; 398/91
(58) Field of Classification Search .................. 398/92, 398/79, 81, 84, 85, 87, 95, 97, 91, 83
See application file for complete search history.

(56) References Cited

U.S. PATENT DOCUMENTS
5,936,763 A * 8/1999 Mitsuda et al. .......... 359/341.33
(Continued)

FOREIGN PATENT DOCUMENTS
AU 3796300 A 12/2000
(Continued)

OTHER PUBLICATIONS

Noboru Takachio et al., "Application of Raman-Distributed Amplification to WDM Transmission Systems Using 1.55-μm Dispersion-Shifted Fiber", Journal of Lightwave Technology, vol. 19, No. 1, pp. 60-69, 2001.

(Continued)

*Primary Examiner* — Ken N Vanderpuye
*Assistant Examiner* — Hibret A Woldekidan
(74) *Attorney, Agent, or Firm* — Harness, Dickey & Pierce, P.L.C.

(57) ABSTRACT

An inline repeater that uses a forward-pumped DRA that can use a pumping light source such as an FBG pumping light source and a fiber laser, which are the most commonly used, and an optical fiber communication system are realized. The optical fiber communication system comprises silica fiber as a gain medium for Raman amplification to amplify a signal light; a pumping light source that emits a pumping light that co-propagates through the silica fiber in the same direction as the signal light; and a multiplexer disposed between the silica fiber and the pumping light source that multiplexes the signal light and the pumping light, with the multiplexer being provided with a means to multiplex the signal light input thereto having a wavelength longer than the zero-dispersion wavelength of the silica fiber and the pumping light emitted from the pumping light source, and the pumping light source being equipped with a means to emit pumping light, with the longest wavelength of the pumping light being shorter than the shortest wavelength of the signal light by a frequency difference on the low-frequency side of 13.7 to 30 THz.

4 Claims, 20 Drawing Sheets

U.S. PATENT DOCUMENTS

| | | | |
|---|---|---|---|
| 6,424,459 B1 * | 7/2002 | Yokota | 359/341.42 |
| 6,798,564 B2 * | 9/2004 | Inoue et al. | 359/334 |
| 6,882,466 B1 | 4/2005 | Shimojoh et al. | |
| 7,692,852 B2 * | 4/2010 | Akasaka et al. | 359/341.31 |
| 2001/0036347 A1 | 11/2001 | Hansen et al. | |
| 2002/0018456 A1 | 2/2002 | Kakemizu et al. | |
| 2003/0133179 A1 * | 7/2003 | Islam et al. | 359/334 |
| 2003/0169479 A1 * | 9/2003 | Liu | 359/334 |
| 2003/0170028 A1 * | 9/2003 | Mori et al. | 398/79 |
| 2004/0028416 A1 * | 2/2004 | Miyamoto et al. | 398/147 |
| 2004/0184491 A1 * | 9/2004 | Wai et al. | 372/27 |
| 2004/0190909 A1 * | 9/2004 | Akasaka et al. | 398/173 |
| 2006/0126165 A1 * | 6/2006 | Tian et al. | 359/337 |

FOREIGN PATENT DOCUMENTS

| | | |
|---|---|---|
| CA | 2309789 A1 | 12/2000 |
| CA | 2335891 A1 | 9/2001 |
| CN | 1288172 A | 3/2000 |
| CN | 1279549 A | 1/2001 |
| CN | 1490659 | 4/2004 |
| EP | 1059747 A1 | 12/2000 |
| EP | 1076434 A2 | 2/2001 |
| EP | 1091509 A1 | 4/2001 |
| EP | 1130825 A1 | 9/2001 |
| EP | 1265381 A1 | 12/2002 |
| FR | 2796783 A | 1/2001 |
| JP | 2001-27770 A | 1/2001 |
| JP | 2001-102666 A | 4/2001 |
| JP | 2001-343673 A | 12/2001 |
| JP | 2002-280652 A | 9/2002 |
| JP | 2003-57692 A | 2/2003 |

OTHER PUBLICATIONS

Chinese Office Action issued Nov. 30, 2007, on the counterpart Chinese Patent Application No. 200580001547.2.

H. Masuda et. al., "Optical SNR enhanced amplification in long-distance recirculating-loop WDM transmission experiment using 1580 nm band hybrid amplifier", Electronics Letter, vol. 35, No. 5, Mar. 4, 1999.

N. Takachio et. al., "32×10 Gb/s distributed Raman amplification transmission with 50-GHz channel spacing in the zero-dispersion region over 640 km of 1.55μm dispersion-shifted fiber", NTT Network Innovation Laboratories, OFC 2000.

M.D. Mermelstein et. al., "RIN transfer analysis in pump depletion regime for Raman fibre amplifiers", Electronics Letters, vol. 38, No. 9, Apr. 25, 2002.

K. Inoue, "Four-Wave Mixing in an Optical Fiber in the Zero-Dispersion Wavelength Region", Journal of Lightwave Technology, vol. 10, No. 11, Nov. 1992.

R. P. Espindola et. al., "Penalty-free 10 Gbit/s single-channel co-pumped distributed Raman amplification using low RIN 14xx nm DFB pump", Electronics Letters, vol. 38, No. 3, Jan. 31, 2002.

Y. Ohki et. al., "Increase of Relative Intensity Noise after Fiber Transmission in Co-propagating Raman Pump Lasers", Optical Society of America, Optical Amplifiers and their Applications Topical Meeting, Postdeadline Papers, Vancouver, Canada, Jul. 14-17, 2002.

R.H. Stolen, "Nonlinearity in Fiber Transmission", Proceedings of the IEEE, vol. 68, No. 10, Oct. 1980.

H. Masuda et. al., "Wideband, gain-flattened, erbium-doped fibre amplifiers with 3dB bandwidths of ≧ 50 nm", Electronics Letter, vol. 33, No. 12, Jun. 5, 1997.

H. Masuda et. al., "1.28 Tbit/s (32×43 Gbit/s) field trial over 528 km (6×88 km) DSF using L-band remotely-pumped EDF/distributed Raman hybrid inline amplifiers", Electronics Letters, vol. 39, No. 23, Nov. 13, 2003.

H. Masuda et. al., "Gain Monitoring of Erbium-Doped Fiber Amplifiers by Detecting Spontaneous Emission", IEEE Photonics Technology Letters, vol. 5, No. 9, Sep. 1993.

H. Masuda et. al., "Pump-wavelength detuning method for forward pumped distributed Raman amplification systems", Electronics Letters, vol. 41, No. 10, May 12, 2005.

H. Masuda et. al., "Field trial using remotely-pumped EDF/DRA hybrid inline repeater system with 1.28 Tbit/s (32×43 Gbit/s) over 528 km (6×88 km) DSF in the L-band", The Institute of Electronics, Information and Communication Engineers Technical Report, vol. 104, No. 25, Apr. 16, 2004.

* cited by examiner

INLINE REPEATER AND OPTICAL FIBER COMMUNICATION SYSTEM

TECHNICAL FIELD

The present invention relates to a distributed Raman amplification system that optically amplifies optical signals in optical fiber installed throughout a city serving as a transmission path, and an optical fiber communication system that performs optical amplification with a passive remotely-pumped module installed away from an inline repeater or terminal apparatus.

Priority is claimed on Japanese Patent Application No. 2004-184601, filed Jun. 23, 2004, and Japanese Patent Application No. 2004-292377, filed Oct. 5, 2004, the content of which is incorporated herein by reference.

BACKGROUND ART

FIGS. 21 and 22 show examples of distributed Raman amplification systems (DRA systems) in the prior art used in wavelength division multiplexing (WDM) optical fiber communication systems (refer, for example, to Non-Patent Documents 1 or 2). FIG. 21 shows a backward-pumped DRA, while FIG. 22 shows a bi-directionally-pumped DRA. This DRA system uses dispersion-shifted fiber (DSF) as a transmission path, with the typical value of the zero-dispersion wavelength ($\lambda_0$) being 1540 to 1560 nm (the rated value has a slightly wider wavelength range).

In the backward-pumped DRA shown in FIG. 21, the wavelength of the WDM signal light is in the so-called L band (1575-1605 nm) (typical value), with the wavelengths of the pumping lights for backward pumping being 1470 nm and 1500 nm. In the case of the bi-directionally pumped DRA in FIG. 22, the wavelength of the signal light is in the so-called C band (1530-1560 nm) (typical value), with the wavelengths of the forward and backward pumping lights being 1420 nm and 1450 nm.

Pumping light is introduced from the inline repeaters 1-3, 2-3, 1-4, and 2-4 into the transmission path in the opposite direction to the signal light using multiplexers 14 and 24. The pumping light sources are laser diode light sources having a fiber Bragg grating (FBG) as an external mirror (laser diodes with a fiber Bragg grating, FBG pumping light sources), which are the most commonly used.

The inline repeaters 1-3, 2-3, 1-4, and 2-4 contain an erbium-doped fiber amplifier (EDFA) 16 and 26. The signal light that leaves the inline repeaters 1-3 and 1-4 on the upstream side of the DSF and propagates through the DSF undergoes distributed Raman amplification near the inline repeaters 2-3 and 2-4 on the downstream side of the DSF, and after the distributed amplification in the transmission path, undergoes the lumped amplification in EDFAs 16 and 26.

FIG. 21 shows an attempt to improve the signal-to-noise ratio (SNR) using backward-pumped DRA. In order to further improve the SNR, FIG. 22 uses a bi-directionally pumped DRA with added FBG pumping light sources 13-3 and 23-3 and multiplexers 15 and 25 as forward-pumped DRA. However, in the prior art, when applying forward-pumped DRA, the signal light wavelength band becomes limited to the C band (1530-1560 nm) (in the present invention, as shown below, signal light amplification by forward-pumped DRA is possible in the L band (1575-1605 nm)).

In the constitution shown in FIG. 21, in the case of performing forward distributed Raman amplification with the aim to further improve the SNR, similarly to backward distributed Raman amplification, amplification is carried out using pumping light with wavelengths approximately 100 nm shorter than the wavelength of the signal light. The pumping light wavelength is, for example, 1470 nm and 1500 nm (similar to the case of backward distributed Raman amplification in FIG. 21). FIG. 23 shows the Raman gain spectrum at this time. The horizontal axis of FIG. 23 represents wavelength (nm) and the vertical axis shows gain (dB). According to FIG. 23, in the L band of 1575-1605 nm, a flat gain spectrum is obtained.

Non-Patent Document 1: H. Masuda et al., Electronics Letters, Vol. 35, No. 5, pp. 411-412, 1999.
Non-Patent Document 2: N. Takachio et al., OFC, PD9, pp. 1-3, 2000.
Non-Patent Document 3: M. D. Mermelstein et al., Electronics Letters, Vol. 38, No. 9, pp. 403-405, 2002.
Non-Patent Document 4: K. Inoue, Journal of Lightwave Technology, Vol. 10, No. 11, pp. 1553-1561, 1992.
Non-Patent Document 5: R. P. Espindola et al., Electronics Letters, Vol. 38, pp. 113-115, 2002.
Non-Patent Document 6: Y. Ohki et al., OAA, PD7, pp. 1-3, 2002.
Non-Patent Document 7: R. H. Stolen, Proceedings of the IEEE, Vol. 68, pp. 1232-1236, 1980.
Non-Patent Document 8: H. Masuda et al., Electronics Letters, Vol. 33, No. 12, pp. 1070-1072, 1997.
Non-Patent Document 9: H. Masuda et al., Electronics Letters, Vol. 39, No. 23, pp. 1-2, 2003.
Non-Patent Document 10: H. Masuda et al., IEEE Photonics Technology Letters, Vol. 5, No. 9, pp. 1017-1019, 1993.

DISCLOSURE OF THE INVENTION

Problems to be Solved by the Invention

FIG. 24 shows the SNR spectra of the signal light in the case of adding forward-pumped DRA as shown in FIG. 22 to the conventional DRA system shown in FIG. 21. In FIG. 24, wavelength (nm) is shown on the horizontal axis, while SNR (dB) is shown on the vertical axis. As stated above, the signal light wavelength is in the L band (1575-1605 nm), while the pumping light wavelengths are 1470 nm and 1500 nm.

It is apparent in FIG. 24 that prominent SNR degradation occurs around a signal light wavelength of 1589 nm. Bit error rate (BER) measurement performed to evaluate the transmission characteristics showed that BER degradation occurs in the wavelength region where the SNR is approximately 25 dB or less. This is because the signal light wavelength in this wavelength region (around 1589 nm) and the pumping light wavelength (1500 nm) are symmetrical with respect to the zero-dispersion wavelength (1545 nm), and the relative intensity noise (RIN) of the pumping light transfers to the signal light due to stimulated Raman scattering (RIN transfer), and non-degenerate four-wave mixing (ND-FWM) occurs between the pumping light having a wide oscillation spectrum and the signal light (refer to Non-Patent Documents 3 and 4).

In the aforementioned wavelength arrangement, the group velocities of the signal light and the pumping light are nearly the same, and so the signal light quality degradation due to the aforementioned two phenomena (RIN transfer and ND-FWM) becomes prominent. RIN transfer becomes pronounced with high-RIN pumping light sources such as FBG pumping light sources and fiber lasers.

Consequently, suppression of RIN transfer has been reported in which special, low-RIN pumping light sources (multimode distributed feedback (DFB) laser diodes (LD) and inner grating multimode (iGM) LDs) were manufactured, and such an improved pumping light source is applied to the DRA system shown in FIG. 22 (in this case, however, the forward-pumped DRA is used) (refer to Non-Patent Documents 5 and 6). However, such special pumping light sources are expensive and suffer from having a low stimulated Brillouin scattering (SBS) threshold. They also lack the ability to suppress ND-FWM. By contrast, FBG pumping light sources and fiber lasers have a high SBS threshold.

The present invention was achieved in view of the above circumstances and has as its object to provide an inline repeater employing a forward-pumped DRA that can use pumping light sources such as FBG pumping light sources and fiber lasers, the most commonly used kind, and also provide an optical fiber communication system.

Means for Solving the Problem

The present invention is an optical fiber communication system comprising: silica fiber as a gain medium for Raman amplification to amplify a signal light; a pumping light source that emits a pumping light that co-propagates through the silica fiber in the same direction as the signal light; and a multiplexer disposed between the silica fiber and the pumping light source that multiplexes the signal light and the pumping light.

In the present invention, the multiplexer is provided with a means to multiplex the signal light input thereto having a wavelength longer than the zero-dispersion wavelength of the silica fiber and the pumping light emitted from the pumping light source, and the pumping light source is equipped with a means to emit pumping light, with the longest wavelength of the pumping light being shorter than the shortest wavelength of the signal light by a frequency difference on a low-frequency side of 13.7 to 30 THz.

Thereby, the problem in the prior art of signal light quality degradation due to RIN transfer and ND-FWM can be solved.

Also, the silica fiber may be a dispersion-shifted fiber, and the signal light may comprise a plurality of wavelengths in the L band.

Thereby, when the transmission path is a dispersion-shifted fiber (DSF), the problem in the prior art of signal-to-noise ratio (SNR) degradation can be suppressed.

Alternatively, the silica fiber may be a non-zero dispersion-shifted fiber, and the signal light may comprise a plurality of wavelengths in the C band.

Thereby, when the transmission path is a non-zero dispersion-shifted fiber, the problem in the prior art of SNR degradation due to RIN transfer and ND-FWM can be suppressed.

Also, a remotely-pumped double-pass EDF module may be provided at a signal light output stage of the silica fiber, and the wavelength of the pumping light may be not less than 1430 nm and not more than 1470 nm.

Thereby, the wavelength dependency of the pumping light is small, and so the remotely-pumped double-pass EDF module can be practically operated even at a pumping light wavelength of 1430 nm.

Also, a remotely-pumped single-pass EDF module may be provided at a signal light output stage of the silica fiber, and the wavelength of the pumping light may be not less than 1440 nm and not more than 1470 nm.

Thereby, since the pump efficiency of the remotely-pumped single-pass EDF module is inferior to the pump efficiency of the double-pass EDF module, the usable range of the wavelength of the pumping light is longer (1440 nm or higher) than that of the double-pass EDF module.

Also, the pumping light source may be a laser diode with a fiber Bragg grating or a fiber laser.

Also, when the minimum value of the wavelength of the signal light is $\lambda s$, the minimum value of the zero-dispersion wavelength of the silica fiber is $\lambda_0$, and the maximum value of the wavelength of the pumping light from the pumping light source is $\lambda p$, the wavelength of the signal light, the zero-dispersion wavelength, and the wavelength of the pumping light may be set so that $2\lambda_0 - \lambda s > \lambda p$.

When the pumping light source is a multiwavelength laser diode with a fiber Bragg grating or a Fabry-Perot laser diode, and the wavelength of the signal light, the zero-dispersion wavelength, and the wavelength of the pumping light may be set so that $2\lambda_0 - \lambda s > \lambda p + 10$.

When the pumping light source is a fiber Raman laser, a laser diode with a single-wavelength fiber Bragg grating, a laser diode with a multiwavelength fiber Bragg grating, or a Fabry-Perot laser diode, and the wavelength of the signal light, the zero-dispersion wavelength, and the wavelength of the pumping light may be set so that $2\lambda_0 - \lambda s > \lambda p + 15$.

Thereby, in the case of the worst-case noise condition in which noise is at a maximum being defined as $2\lambda_0 - \lambda s = \lambda p$, this condition can be avoided.

At this time, it is preferable that the width of the multiwavelength be 10 nm or less.

Also, the pumping light source may be provided with a variable attenuator on an output side of a polarization multiplexing Fabry-Perot laser diode to adjust an output of the pumping light from each Fabry-Perot laser diode.

Thereby, differences among the wavelengths of the pumping light (average wavelengths) of each laser diode due to temperature change or manufacturing variations can be compensated.

Also, the optical fiber communication system may have an erbium-doped fiber amplifier having: an erbium-doped fiber gain block provided with erbium-doped fiber as a gain medium; a gain equalization optical filter disposed before or after the erbium-doped fiber gain block; a population inversion detection circuit that measures a population inversion amount in the erbium-doped fiber; and a population inversion adjustment circuit that controls the erbium-doped fiber gain block so that the population inversion amount measured by the population inversion detection circuit is a prescribed value.

Thereby, while using the erbium-doped fiber amplifier, which is used when not applying forward-pumped DRA, the Raman gain spectrum newly added by applying the forward-pumped DRA can be compensated by the gain reduction of the erbium-doped fiber in the erbium-doped fiber gain block.

It is preferable that the excited-state filling factor $N_2$ of the erbium-doped fiber be less than 38%.

Also, a power spectrum of the signal light may be set so that the power of the signal light input to the silica fiber decreases the further to the short wavelength side where the Raman gain due to the Raman amplification is large.

Thereby, even when nonlinear effects occur in the silica fiber, the net gain spectrum can be flattened.

Also, the silica fiber may be silica fiber laid throughout a city. Alternatively, the silica fiber may be silica fiber for lumped optical amplification.

Also, the wavelength of the signal light may be a single wavelength, with the difference between the wavelength of the signal light and the longest wavelength of the pumping light being, in terms of a frequency difference, 15.6 THz or more.

When the wavelength of the signal light is a single wavelength, the wavelength region occupied by the signal light is generally extremely narrow compared to a multiwavelength WDM system. Therefore, the problem of signal light quality deterioration due to RIN transfer and ND-FWM can be solved without securing the flatness of the gain spectrum.

Even if the inline repeater of the present invention is replaced with a transmission terminal apparatus (transmitter), the present invention can be similarly described.

Effects of the Invention

The present invention can solve the problem in the prior art of signal light quality deterioration caused by RIN transfer and ND-FWM.

Figure 1:
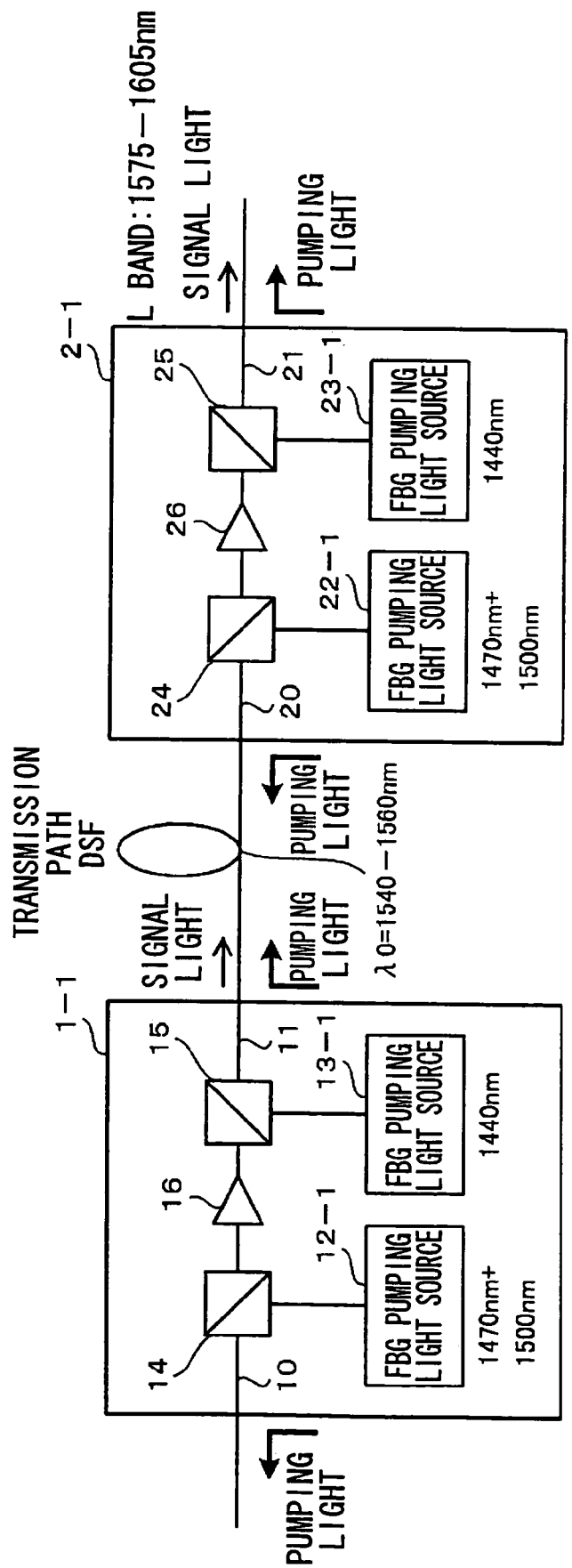
FIG. 1 is an overall block diagram of the optical fiber communication system according to the first embodiment.

DESCRIPTION OF REFERENCE SYMBOLS 1-1, 1-2, 1-3, 1-4, 2-1, 2-2, 2-3, 2-4 inline repeater
10, 11, 20, 21 silica fiber
12-1, 12-2, 12-3, 13-1, 13-2, 13-3, 22-1, 22-2, 22-3, 23-1, 23-2, 23-3 FBG pumping light source
14, 15, 24, 25 multiplexer
16, 26 EDFA
30 remotely-pumped EDF module
40 variable attenuator
41 Fabry-Perot LD
42 polarization beam combiner
51, 53 EDF gain block
52 gain equalization optical filter
54 population inversion detecting circuit
55 population inversion adjustment circuit
70 optical amplifier

BEST MODE FOR CARRYING OUT THE INVENTION

Embodiments of the present invention shall now be described with reference to the accompanying drawings. Note that the present invention is not limited to these embodiments, and for example the technical concepts disclosed in the embodiments may be suitably combined.

First Embodiment

FIG. 1 is an overall block diagram of the optical fiber communication system according to the first embodiment.

As shown in FIG. 1, the present embodiment employs the inline repeaters 1-1 and 2-1 that have silica fibers 10, 11, 20, and 21 as a Raman amplification gain medium for amplifying a signal light; fiber Bragg grating (FGB) pumping light sources 12-1, 13-1, 22-1, and 23-1 that emit pumping light that co-propagates through the silica fibers 10, 11, 20, and 21 in the same direction as the signal light; and multiplexers 14, 15, 24, and 25 disposed between the silica fibers 10, 11, 20, and 21 and the FGB pumping light sources 12-1, 13-1, 22-1, and 23-1 that multiplex the signal light and the pumping light.

In the present embodiment, the multiplexers 14, 15, 24, and 25 are provided with a means to multiplex the signal light and the pumping light. Specifically, the signal light, which has a longer wavelength than the zero-dispersion wavelength of the silica fibers 10, 11, 20, and 21, is input to the multiplexers 14, 15, 24, and 25 to be multiplexed with the pumping light emitted from the FGB pumping light sources 12-1, 13-1, 22-1, and 23-1. In addition, the FGB pumping light sources 12-1, 13-1, 22-1, and 23-1 are provided with a means to emit pumping light of a wavelength that is shorter than the wavelength of the signal light by, in terms of frequency difference, 13.7 THz or more.

The silica fibers 10, 11, 20, and 21 are dispersion-shifted fibers, and the signal light has multiple wavelengths in the L band. The wavelength of the pumping light is 1470 nm or less.

Hereinbelow, the first embodiment shall be described in greater detail.

Figure 21:
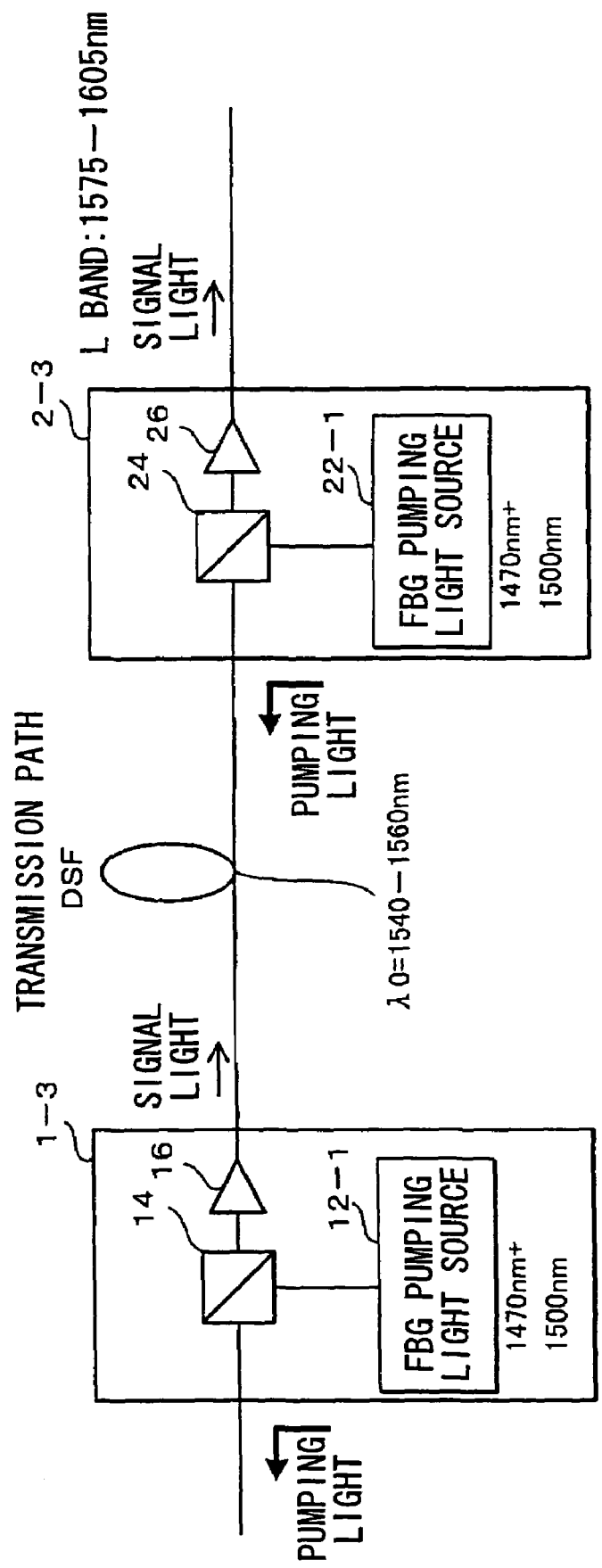
FIG. 21 is a drawing that shows the conventional constitution of a backward-pumped DRA.

FIG. 1 shows the optical fiber communication system of the first embodiment. The present embodiment mainly differs from the prior art constitution shown in FIG. 21 on the following points. In the present embodiment, forward distributed Raman amplification (forward DRA) is conducted using 1440 nm pumping light. The pumping light source 13-1 for such pumping light is disposed in the upstream inline repeater 1-1.

Figure 2:
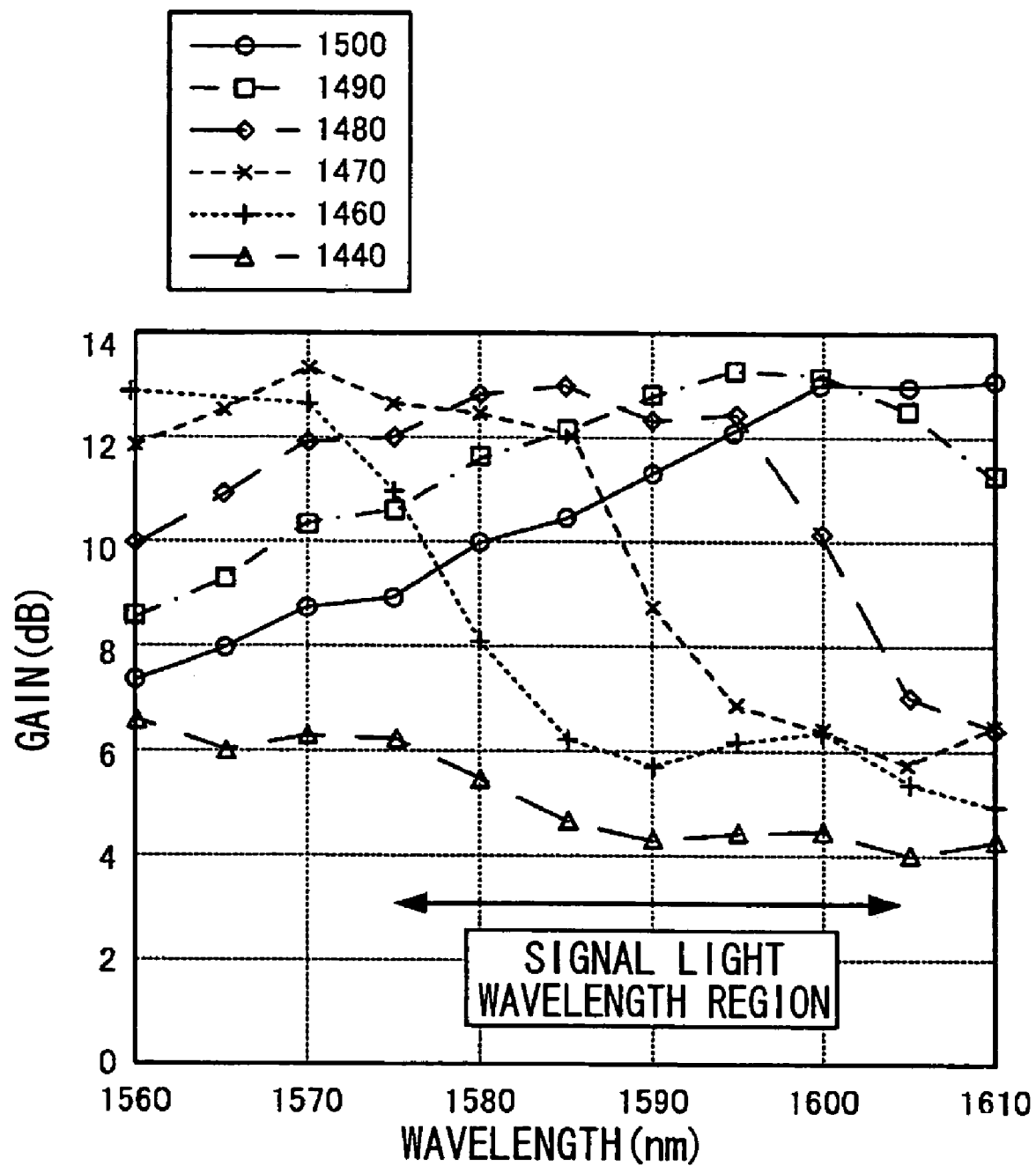
FIG. 2 is a graph showing the relationship between gain and wavelength in the optical fiber communication system according to the first embodiment.
Figure 3:
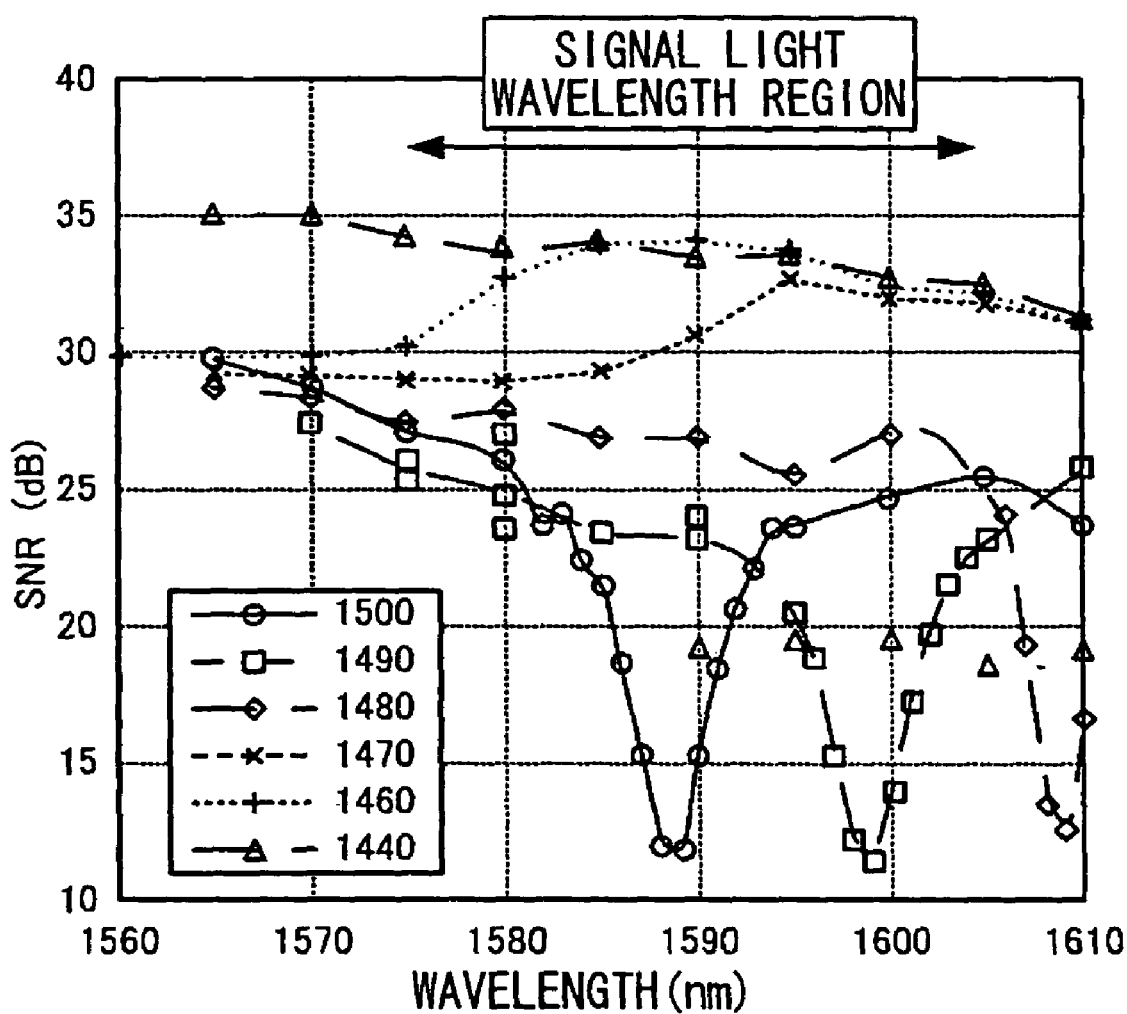
FIG. 3 is a graph showing the relationship between SNR and wavelength in the optical fiber communication system according to the first embodiment.

FIG. 2 shows the Raman gain spectrum in relation to the present embodiment. In FIG. 2, the horizontal axis represents wavelength (nm) while the vertical axis shows gain (dB). This is the spectra for the case of shortening the single pumping light wavelength of the forward DRA in the optical communication system of FIG. 1 from 1500 nm to 1440 nm. Also, FIG. 3 shows the signal-to-noise ratio (SNR) spectra for those pumping light wavelengths. In FIG. 3, the horizontal axis represents wavelength (nm) while the vertical axis shows gain (dB). The pumping light power in the case of the single pumping light wavelength is the same as the total power (300 mW) for 2 wavelengths (1470 nm and 1500 nm) pumping in the prior art.

FIG. 2 shows that the peak of the gain spectrum within the signal light wavelength region occurs when the single pumping light wavelength is approximately 1470 nm to 1500 nm. Therefore, in the prior art, in order to obtain high gain within the signal light wavelength region, forward DRA was performed with pumping light of at least two wavelengths of approximately 1470 nm and above and approximately 1500 nm and below. For example, in the case of using two wavelengths of pumping light, the total gain spectrum was the combined gain spectra of these two wavelengths. In the prior art, two pumping light wavelengths are selected so that the combined gain spectra is nearly flat. Thus, the prior art is premised on using two or more wavelengths of pumping light in order to obtain high gain and flat gain spectrum within the signal light wavelength region. The use of a single pumping light wavelength and the use of a pumping light wavelength wherein the peak of the gain spectra is outside the signal light wavelength region have not conventionally been considered. The present embodiment uses the single pumping light wavelength described below.

Accordingly, in the prior art, the shortest signal light wavelength (1575 nm in the aforementioned example) and the longest pumping light wavelength (1500 nm in the aforementioned example) are generally separated from each other by only approximately 100 nm, which corresponds to approximately 13 THz in terms of frequency difference. Thus, in the case of there being one signal light wavelength, for example, when the signal light wavelength is 1580 nm, one pumping light wavelength is sufficient, being set to 1480 nm. This gives a wavelength difference of 100 nm, which translates to a frequency difference of 12.8 THz.

According to the SNR spectra shown in FIG. 3, pumping light wavelengths of 1500 nm, 1490 nm and 1480 nm cause the SNR to fall approximately 25 dB or less within the signal light wavelength region. In contrast, pumping light wavelengths of 1470 nm, 1460 nm, and 1440 nm cause minimal SNR degradation within the signal light wavelength region, achieving a high SNR of approximately 30 dB or higher. Also, good bit-error-rate (BER) characteristics were obtained in this case (that is, the pumping light wavelengths of 1470 nm, 1460 nm, and 1440 nm). Moreover, as can be understood from FIG. 2, the Raman gain in the signal light wavelength region was approximately 6 dB or higher for 1470 nm pumping light and approximately 4 dB or higher for 1440 nm pumping light.

Figure 23:
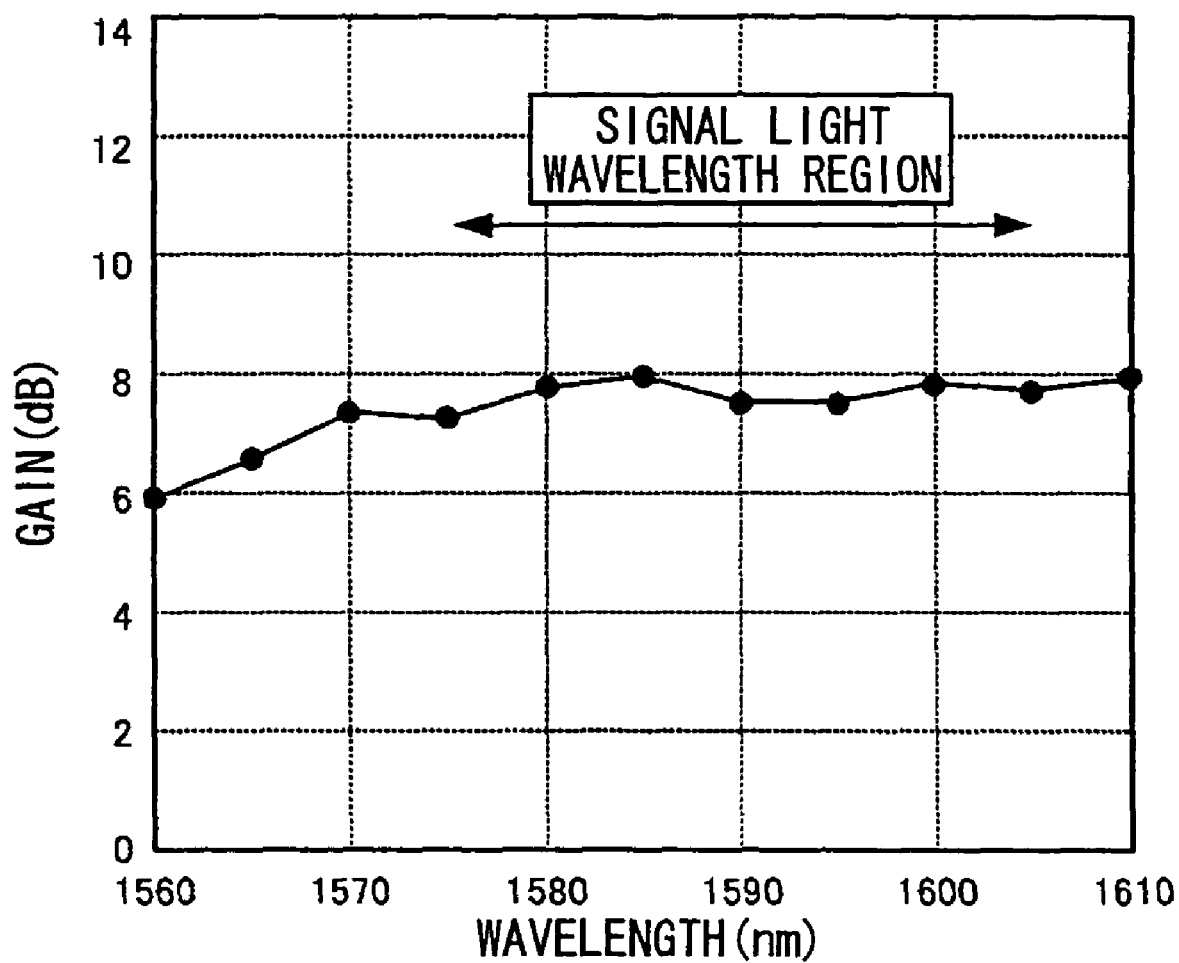
FIG. 23 is a graph that shows the Raman gain spectrum in the prior art.
Figure 24:
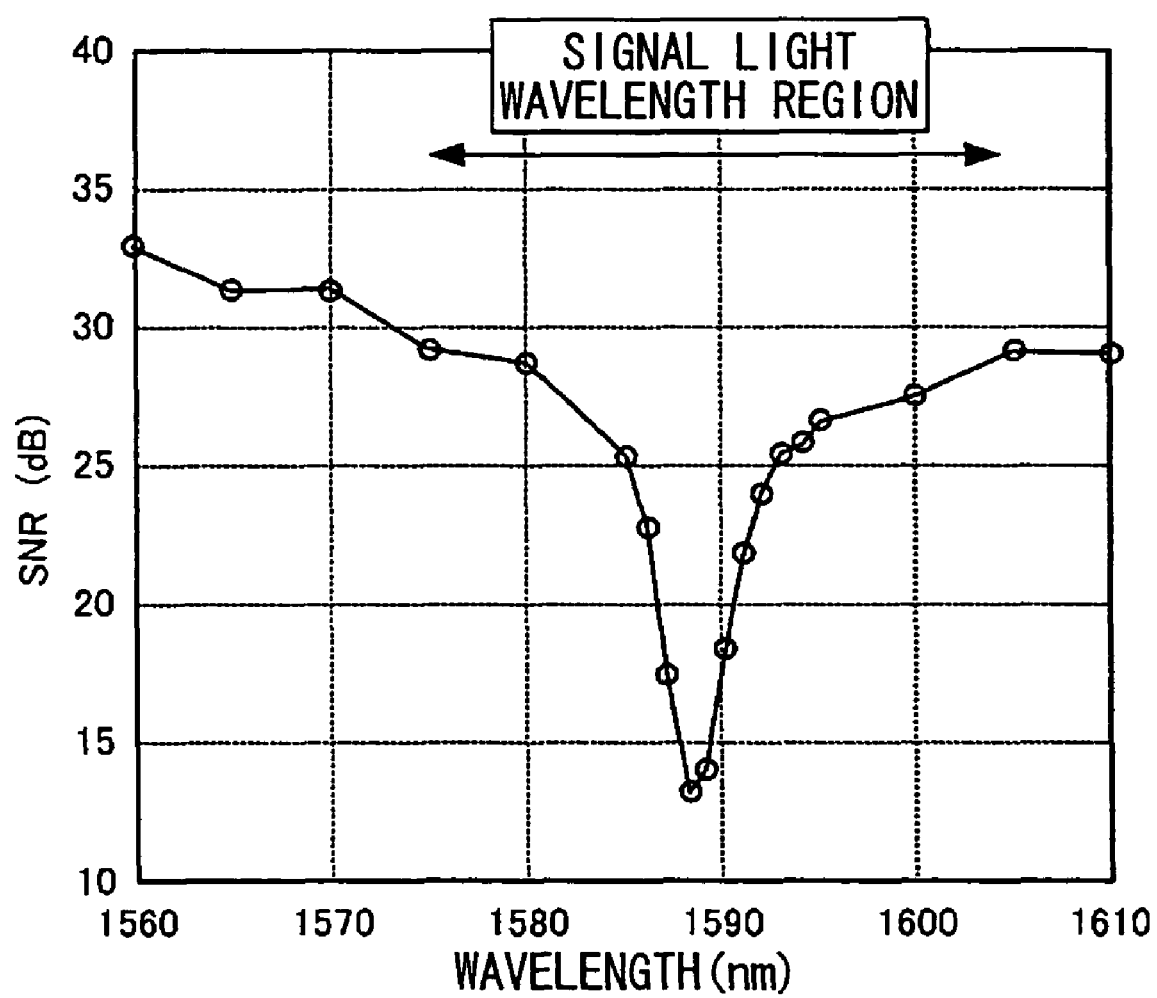
FIG. 24 is a graph that shows the SNR spectrum in the prior art.

Thus, although small compared to the gain of approximately 8 dB shown in FIG. 23, the gain was sufficiently large to yield an SNR improvement by DRA. Also, although a large gain deviation occurred in the signal light wavelength region compared to the prior art, this can be dealt with by performing settings of the signal light level described hereinbelow in accordance with the wavelength.

As described above, in the present embodiment the longest pumping light wavelength (1470 nm in the present embodiment) was set to the short wavelength side of the shortest signal light wavelength (1575 nm) by a value larger than 100 nm (105 nm), which translates to a frequency difference of approximately 13.7 THz. In the case of the signal light wavelength being a single wavelength, such that the signal light wavelength is 1580 nm, a single pumping light wavelength, set to 1460 nm, would be sufficient. The wavelength difference would thus be 120 nm, translating to a frequency difference of 15.6 THz.

Thus, in the case of the signal light being a single wavelength, there is no need to ensure the flatness of the gain spectra. In addition, since the wavelength region occupied by the signal light is generally far narrower than that of a multi-wavelength WDM system, a constitution is possible having a frequency difference smaller than the aforementioned 15.6 THz in the method of the prior art.

Also, the longest pumping light wavelength may be set to the short wavelength side of the shortest wavelength of the signal light so as to have a frequency difference of up to 30 THz. By doing so, according to Non-Patent Document 7, the Raman gain is large enough to ensure an SNR improvement by DRA. On the other hand, in cases other than the aforementioned, that is, when the longest wavelength of the pumping light is set to the short wavelength side of the shortest wavelength of the signal light to have a frequency difference of greater than 30 THz, the Raman gain is small. In addition, while there is nominal SNR improvement by DRA, the benefits brought by such a system are negligible in consideration of the cost of installing the pumping light sources required for performing the aforementioned DRA.

For example, when the shortest signal light wavelength is 1575 nm, if the frequency difference is between 13.7 and 30 THz, the longest wavelength of the pumping light may be in the range of 1361 to 1469 nm. For reference, the relationship between wavelength, frequency, and the speed of light is wavelength=the speed of light/frequency.

In the case of the transmission path being a non-zero dispersion-shifted fiber described below, when the shortest wavelength of the signal light is 1530 nm, as long as the frequency difference is between 13.7 and 30 THz, the longest wavelength of the pumping light may be 1327 to 1430 nm.

Figure 4:
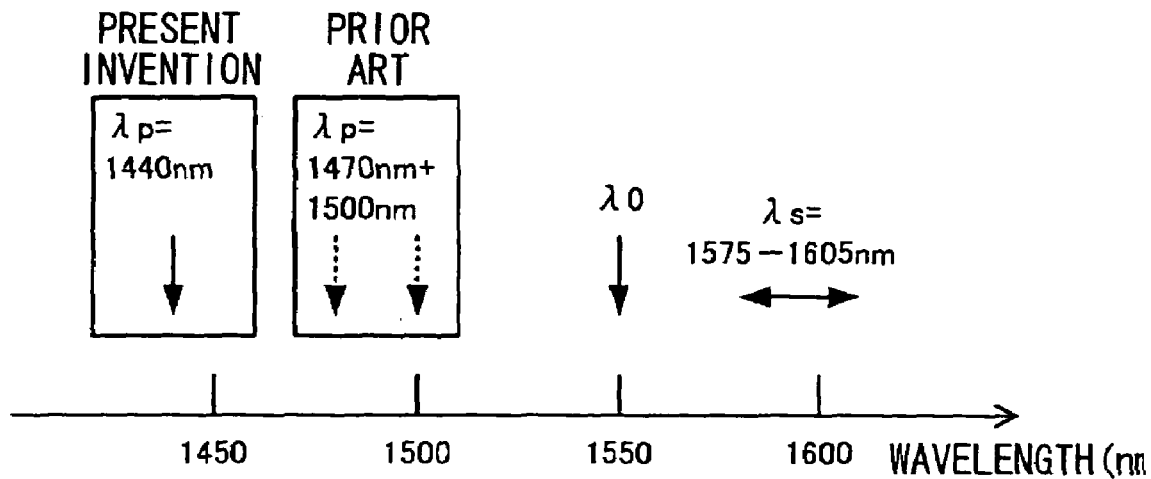
FIG. 4 is a drawing showing the relationship between wavelengths for DSF in the first embodiment.

FIG. 4 shows the relationship between the wavelengths relating to the present embodiment assuming a DSF transmission path. The zero-dispersion wavelength is around 1550 nm, and the signal light wavelength region is 1575 to 1605 nm. The pumping light wavelengths are 1470 nm and 1500 nm in the prior art, and, for example 1440 nm (or 1460 nm, 1470 nm) in the present embodiment.

FIG. 3 shows the case of the zero-dispersion wavelength being 1545 nm. When the zero-dispersion wavelength is 1535 nm, the SNR falls (approximately 25 dB or less) within the signal light wavelength region in the case of the pumping light wavelength being 1470 nm, in addition to 1500 nm, 1490 nm, and 1480 nm.

Figure 5:
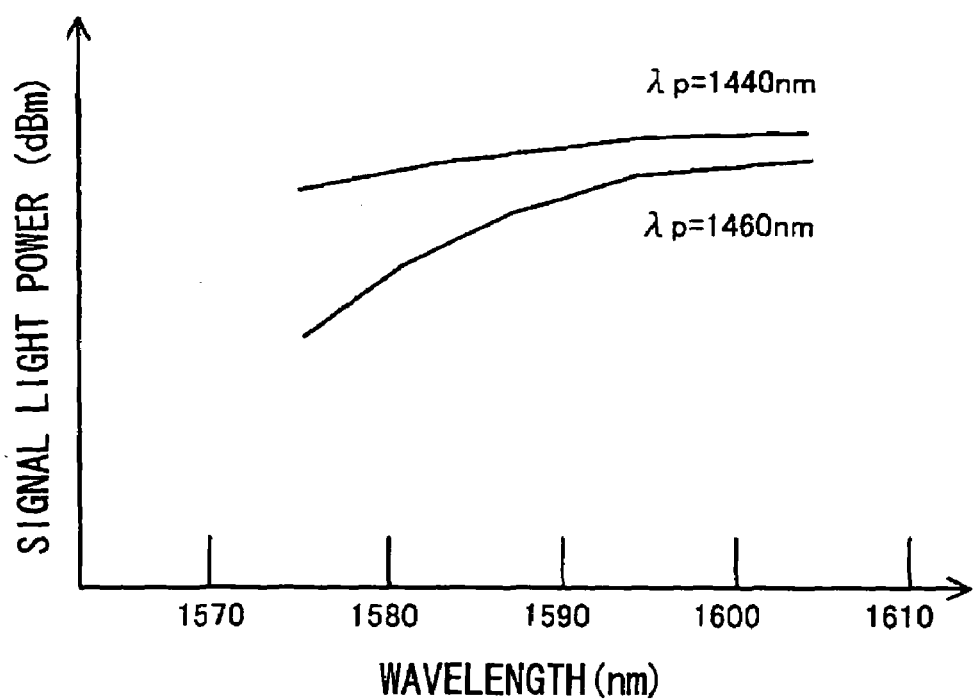
FIG. 5 is a graph showing the relationship between signal light power and wavelength in the first embodiment.

In the present embodiment, as is evident by comparing FIG. 23 and FIG. 2, the Raman amplification spectrum is generally not flat within the signal light wavelength region. In particular, as the pumping light wavelength increases to 1440 nm, 1460 nm, and 1470 nm, the non-flatness increases. FIG. 5 shows the relationship between signal light power and wavelength. The horizontal axis of FIG. 5 represents wavelength (nm) and the vertical axis shows signal light power (dBm). As shown in FIG. 5, the spectrum of the signal light power input to the transmission path DSF becomes non-flat in accordance with the aforementioned pumping light wavelength.

Figure 6:
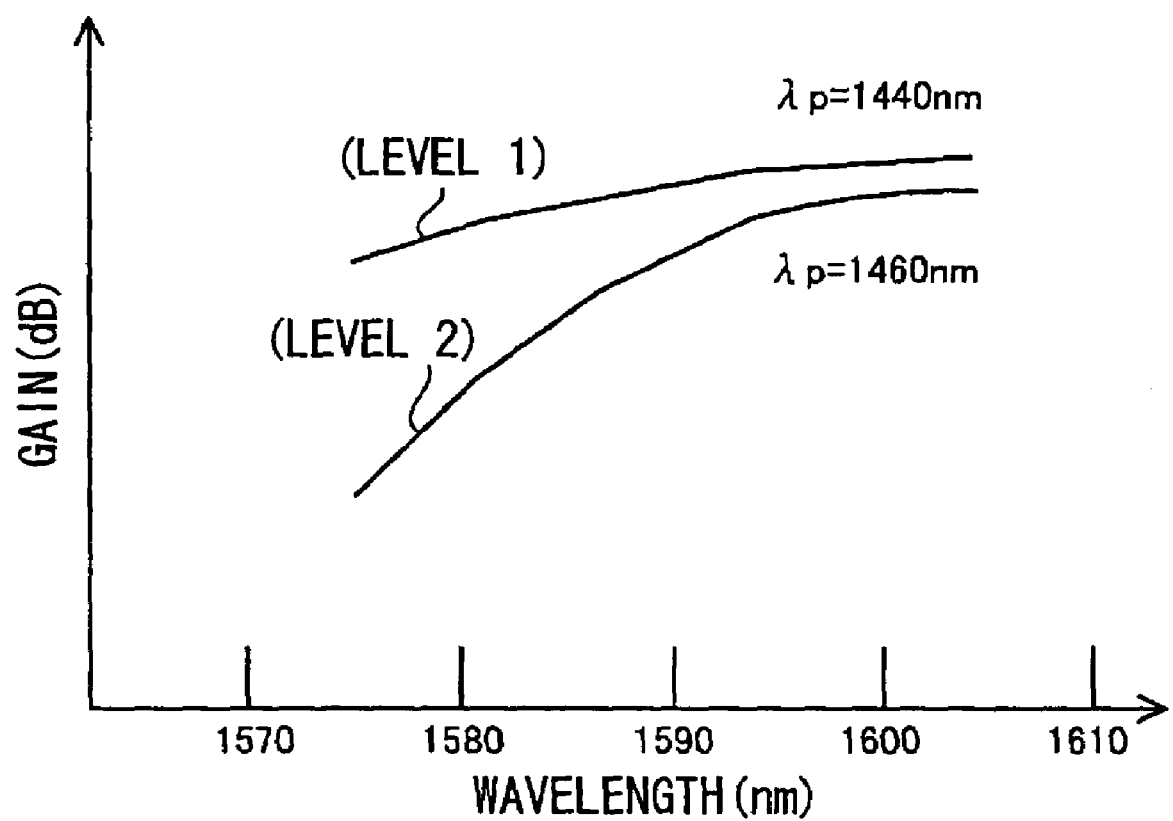
FIG. 6 is a graph showing the relationship between gain and wavelength for EDFA in the first embodiment.

In terms of the nonlinear effect in the transmission path DSF, the further to the wavelength in which the Raman gain is large, the lower the signal light power. FIG. 6 shows the relationship between EDFA gain and wavelength. The horizontal axis of FIG. 6 represents wavelength (nm) and the vertical axis shows gain (dB). In order to flatten the net gain spectrum in the unit inline repeater interval, as shown in FIG. 6, the EDFA gain spectrum is made to be non-flat. It has been found that this can be achieved by reducing the EDFA pumping level and reducing the average population inversion level (refer to Non-Patent Document 8), instead of using a gain equalization filter.

In other words, in FIG. 6, the average population inversion level (Level 1) in the case of the pumping light wavelength being 1440 nm should be made lower than the average population inversion level in the case of the EDFA gain spectrum of the prior art being flat, and the average population inversion level (Level 2) in the case of the pumping light wavelength being 1460 nm should be made lower than Level 1.

The aforementioned embodiment relates to a DRA system that performs distributed amplification of a signal light in a transmission path fiber laid throughout a city (aboveground or undersea) that it is 40 km or 80 km long.

However, in consideration of the operation of signal light amplification in the present embodiment, it can also be applied to lumped amplification of signal light using an EDFA, etc., in an inline repeater. In this case, the gain medium is silica fiber (DSF or the like) that is generally somewhat shorter than that of DRA (such as 10 km or 20 km long). This is also the case for the second and third embodiments described below.

The pumping light sources are laser diode light sources having a fiber Bragg grating (FBG) or a fiber laser as an external mirror (laser diodes with a fiber Bragg grating, FBG pumping light sources, fiber lasers, or fiber laser pumping light sources).

As stated above, according to the present embodiment, when the transmission path is DSF, setting the single pumping light wavelength to approximately 1470 nm or less has the effect of being able to suppress SNR degradation, which is a problem in the prior art.

Second Embodiment

Figure 7:
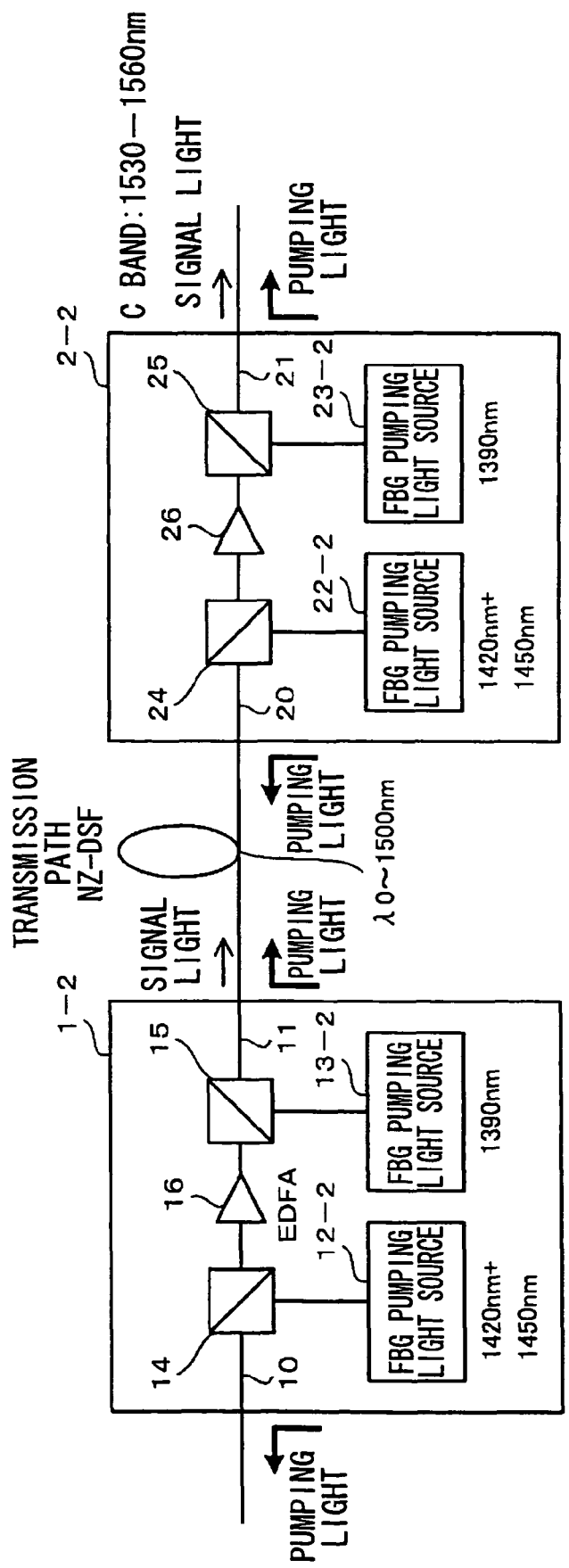
FIG. 7 is an overall block diagram of the optical fiber communication system according to the second embodiment.

FIG. 7 shows the optical fiber communication system according to the second embodiment. The constitution of the inline repeaters 1-1 and 2-1 of the first embodiment shown in FIG. 1 mainly differs from the constitution of the inline repeaters 1-2 and 2-2 of the second embodiment on the following points. That is, in the present embodiment, non-zero dispersion-shifted fiber ((NZ-DSF) such as LEAF fiber (registered trademark)) is employed as the transmission path, with the typical zero-dispersion value being approximately 1500 nm. The signal light wavelength is in the C band (1530 to 1560 nm).

Figure 22:
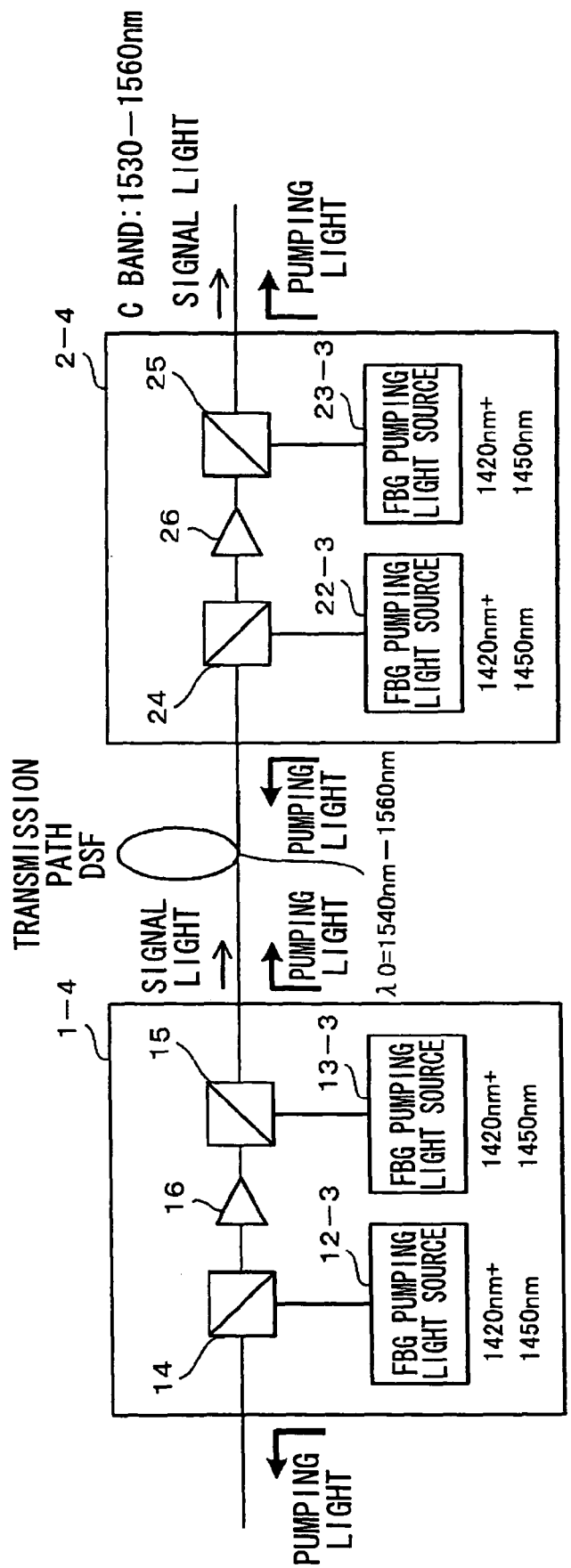
FIG. 22 is a drawing that shows conventional constitution of a bi-directionally pumped DRA.

The pumping light wavelengths in the backward-pumped FBG pumping light sources 12-2 and 22-2 are 1420 nm and 1450 nm, similarly to those shown in FIG. 22 of the prior art, and those of the forward-pumped FBG pumping light sources 13-2 and 23-2 are 1390 nm.

Figure 8:
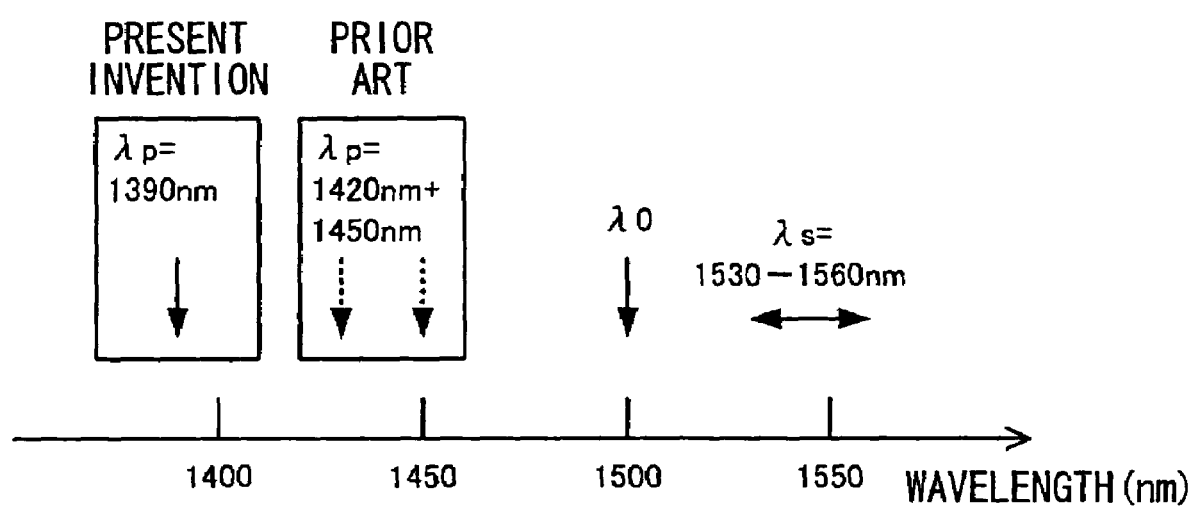
FIG. 8 is a drawing showing the relationship between wavelengths for NZ-DSF in the second embodiment.

FIG. 8 shows the relationship between the wavelengths in the present embodiment. In the prior art, as shown in FIG. 22, the forward-pumped DRA pumping light wavelengths are 1420 nm and 1450 nm, the same as the backward-pumped DRA pumping light wavelengths. In the present embodiment, however, the forward-pumped DRA pumping light wavelengths are 1390 nm as described above.

In general, the pumping light wavelengths are set by a frequency difference of approximately 13.7 THz to the short wavelength side of the shortest signal light wavelength (1530 nm), similarly to the case of the first embodiment. That is, the pumping light wavelength should be set to 1430 nm or less.

Accordingly, similarly to the case shown in FIG. 4, the present embodiment has the effect of being able to suppress SNR degradation due to RIN transfer and ND-FWM, which is a problem in the prior art.

Third Embodiment

Figure 9:
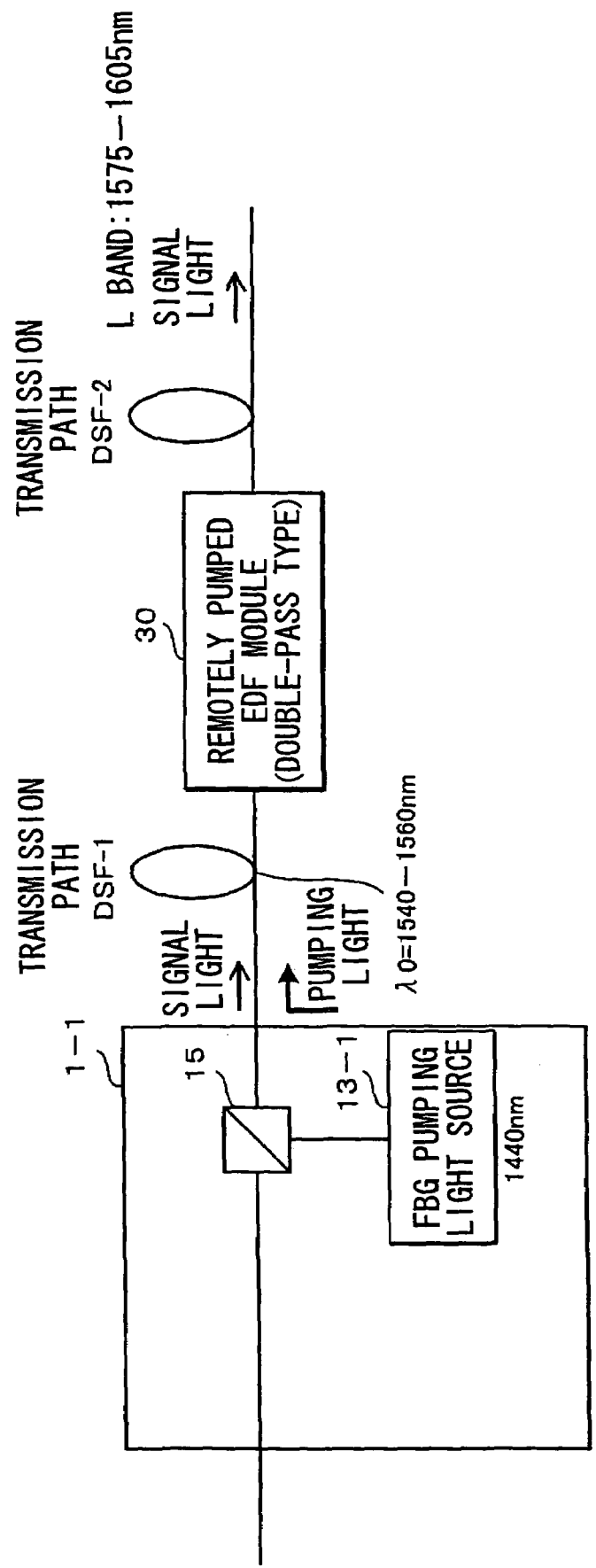
FIG. 9 is a main portion block diagram of the optical fiber communication system according to the third embodiment.

FIG. 9 shows the optical fiber communication system according to the third embodiment. The constitution of the third embodiment differs from that of the first embodiment shown in FIG. 1 on the following points. FIG. 9 has been simplified to show only those points that differ from FIG. 1. In the present embodiment, by disposing a remotely-pumped EDF module 30 at a later stage than the transmission path DSF (DSF-1) in the forward-pumped DRA, remotely-pumped amplification is performed. A double-pass configuration with a high pump efficiency is used as the remotely-pumped EDF module 30 (refer to Non-Patent Document 9).

Figure 10:
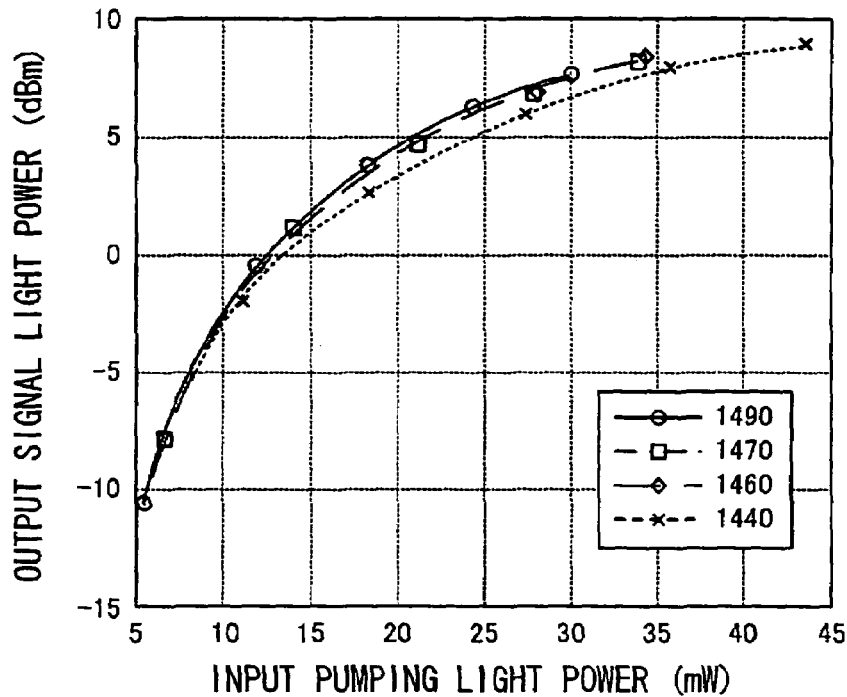
FIG. 10 is a graph showing the relationship between output signal light power and input pumping light power in the third embodiment.

FIG. 10 shows the pumping characteristics of the double-pass remotely-pumped EDF module 30. In FIG. 10, the horizontal axis represents input pumping light power (mW), while the vertical axis represents output signal light power (dBm). The dependency of the total output power of the signal light on the input pumping light power was measured with different pumping light wavelengths (1440, 1460, 1470, and 1490 nm). Based on FIG. 10 and other results, the dependency on the pumping light wavelength was found to be small. Although a wavelength of 1450 to 1480 nm is normally used for pumping EDF, which is the gain medium provided in the remotely-pumped EDF module 30, the double-pass remotely-pumped EDF module 30 was actually proven to operate even with a pumping light wavelength of 1430 nm.

A single-pass remotely-pumped EDF module can be substituted for the double-pass remotely-pumped EDF module 30. In this case, since the pumping efficiency by the single-pass remotely-pumped EDF module is inferior to that of the double-pass remotely-pumped EDF module 30, the usable pumping light wavelengths are longer that of the double-pass remotely-pumped EDF module 30 (1440 nm and longer).

Fourth Embodiment

Detrimental excess noise caused by ND-FWM and RIN transfer, which is prominent in systems that employ FBG pumping light sources or fiber laser pumping light sources, can be avoided with the first and second embodiments. A typical example of the fiber laser pumping light source is a fiber Raman laser.

Here, when the minimum value of a signal light wavelength is $\lambda s$, the minimum value of a zero-dispersion wavelength is $\lambda_0$, and the maximum value of a pumping light wavelength is $\lambda p$, the worst-case condition in which noise is at a maximum can be defined as $$2\lambda_0 - \lambda s = \lambda p \quad (1)$$

In the present invention, when $\lambda_0$ is 1545 nm and $\lambda s$ is 1605 nm, then $\lambda p$ is set to be less than 1470 nm in order to avoid this condition. That is, with the wavelength unit expressed in nm, $$2\lambda_0 - \lambda s > \lambda p + 15 \qquad (2)$$

The aforementioned values are approximate values in the case of the pumping light source being a single-wavelength FBG pumping light source.

Figure 11:
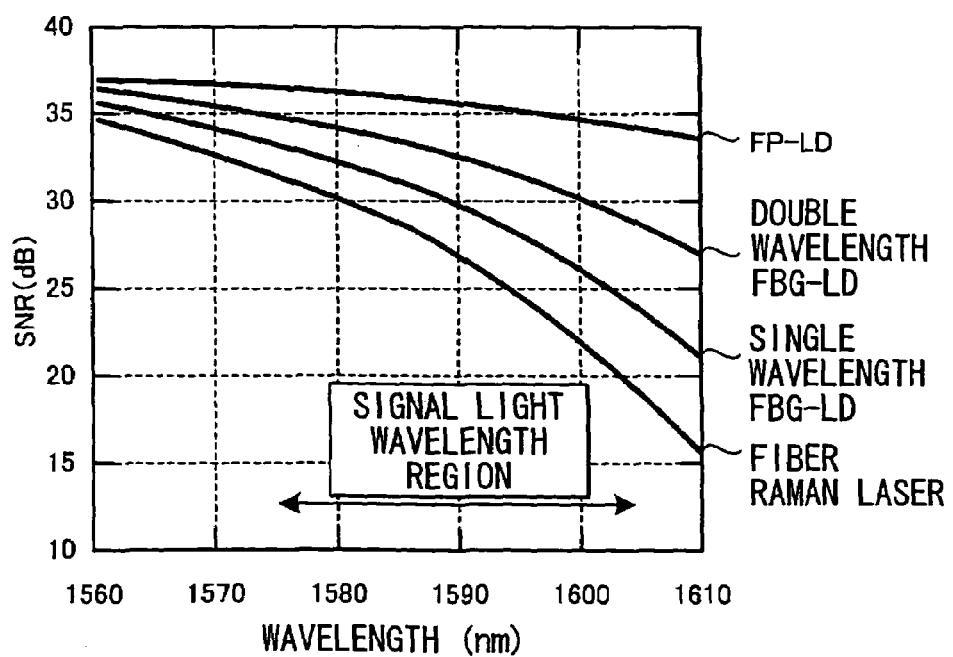
FIG. 11 is a graph showing the SNR spectra of the fourth embodiment.

Investigating cases of using pumping light sources other than a single-wavelength FBG pumping light source revealed the following. FIG. 11 shows the SNR spectra of the fourth embodiment. In FIG. 11, the horizontal axis represents wavelength (nm) and the vertical axis represents SNR (dB). FIG. 11 shows SNR spectra for the same Raman gain in different pumping light sources.

The aforementioned different pumping light sources are specifically a fiber Raman laser, a single-wavelength FBG-LD, a double-wavelength FBG-LD, and a Fabry-Perot LD (FP-LD). The minimum value of the zero-dispersion wavelength $\lambda_0$ is 1530 nm. For a given wavelength, the SNR increases in the order of the fiber Raman laser, single-wavelength FBG-LD, double-wavelength FBG-LD, and FP-LD.

The oscillation wavelength interval $\Delta\lambda$ in the case of a 10 dB drop in intensity of the aforementioned pumping light sources is approximately 0.5 nm for the fiber Raman laser, approximately 2 nm for the single-wavelength FBG-LD, and approximately 10 nm for the FP-LD. In other words, the greater the $\Delta\lambda$, the higher the SNR. Also, in double-wavelength FBG-LD, the number of wavelengths is twice that of the single-wavelength FBG-LD, and so the effective $\Delta\lambda$ is doubled.

From the above, it was found that a high SNR in which the detrimental noise is suppressed can be obtained by using an FP-LD pumping light source or a multiwavelength FBG-LD pumping light source (hereinafter referred to as FBG pumping light source). In the manufacture of a multiwavelength FBG pumping light source, it is important not to markedly raise the average wavelength and the maximum value $\lambda p$ of the pumping light wavelengths by narrowing the wavelength spacing. The average wavelength is the effective value of the pumping light wavelengths, and the maximum value $\lambda p$ is the value to determine the worst-case noise condition in Equation (1). It is preferable that the wavelength spacing be approximately 10 nm or less, given that the $\Delta\lambda$ for the single wavelength FBG-LD is approximately 2 nm. As long as it is greater than 0 nm there is no particular restriction on the lower limit of the wavelength spacing, and thus may be suitably determined depending on the system conditions.

Figure 12:
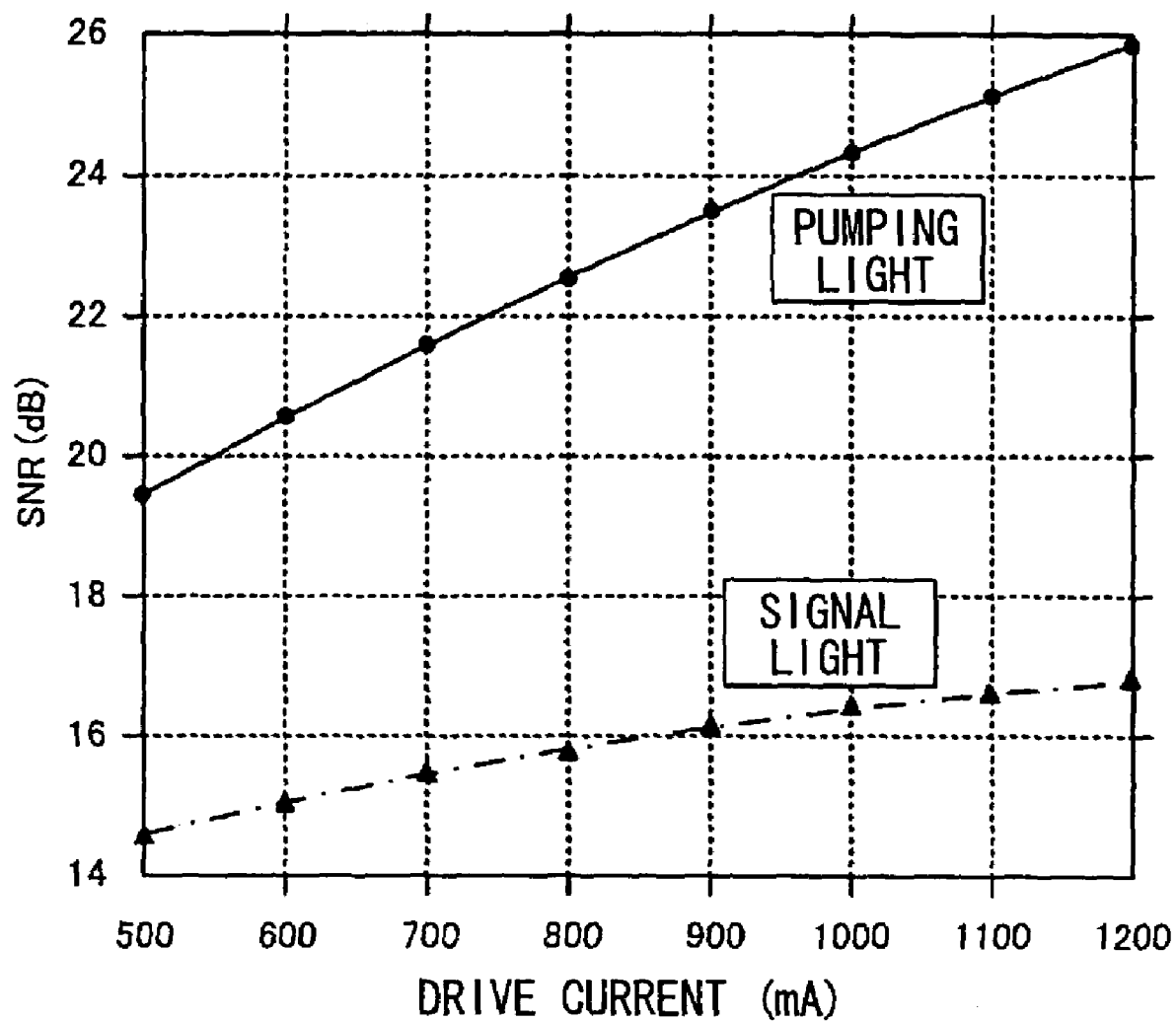
FIG. 12 is a graph showing the relationship between LD drive current and pumping light SNR, signal light SNR when using the FP-LD pumping light source.

FIG. 12 shows the relationship between the LD driving current and the pumping light SNR and the signal light SNR in the case of using a FP-LD pumping light source. In FIG. 12, driving current (mA) is represented on the horizontal axis, while SNR (dB) is represented on the vertical axis. As shown in FIG. 12, it was found that the pumping light SNR and the signal light SNR improve with increases in the drive current. Accordingly, it is advantageous to keep the drive current at a high value.

Figure 13:
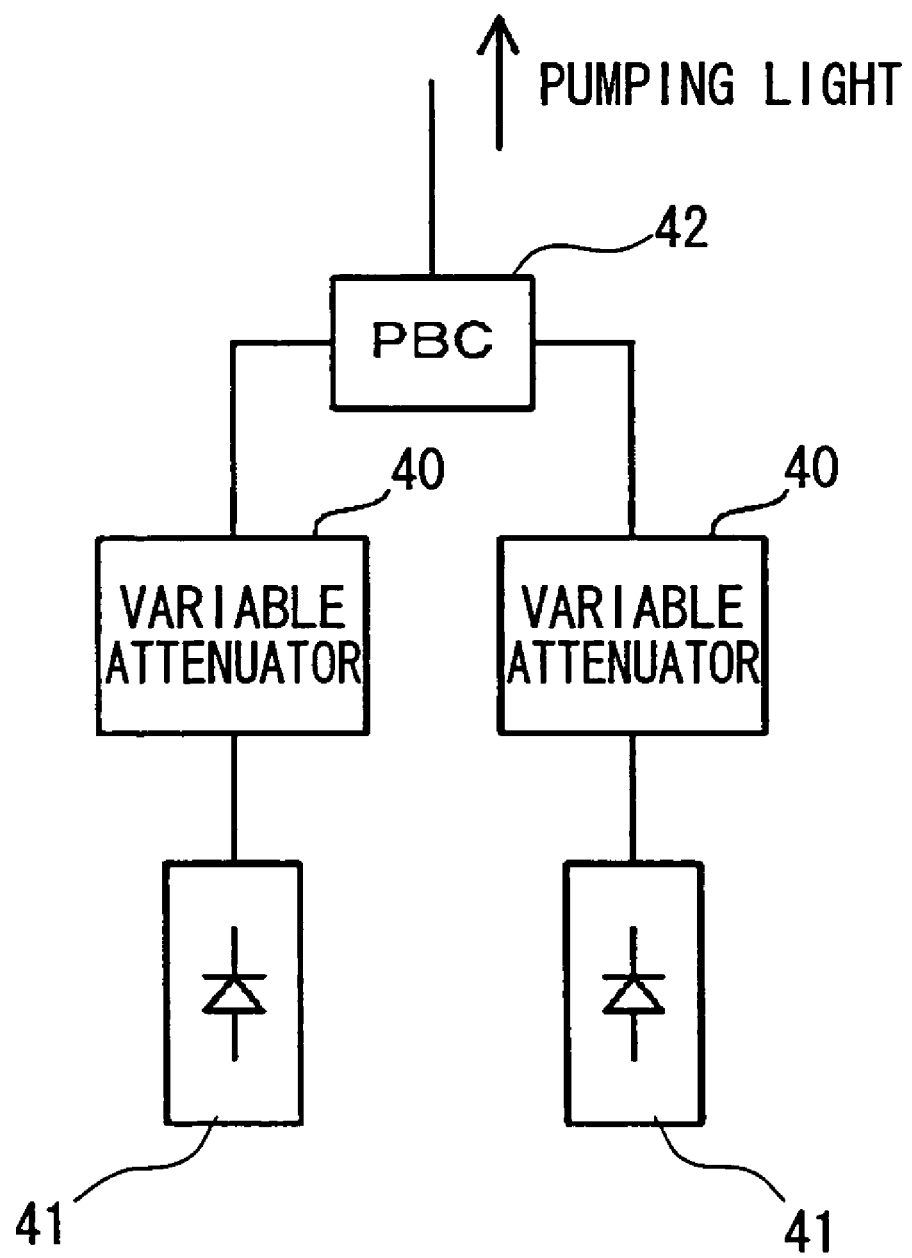
FIG. 13 is a drawing showing the constitution of the FP-LD pumping light source in the fourth embodiment.

FIG. 13 shows the constitution of the FP-LD pumping light source in the fourth embodiment. This pumping light source is constituted as follows to obtain a high SNR. Variable attenuators 40 that adjust the output power are provided for each polarization multiplexing LD 41 (FP-LD).

The pumping lights that emerge from the variable attenuators 40 are multiplexed by the polarization beam combiner (PBC) 42 and thereafter output. The pumping light wavelength (average wavelength) of each LD 41 increases with the drive current and the temperature, rising approximately 3 nm per 100 mA rise in drive current and approximately 4 nm per 10 degree rise in temperature.

Laser diodes have manufacturing variations on the order of approximately ±5 nm. Accordingly, by adjusting the drive current and temperature of the pumping light sources in FIG. 13, the pumping light wavelengths of each LD 41 can be adjusted. Also, the pumping light power that is input from each LD 41 to the PBC 42 can be set to the same value by the variable attenuators 40. An ordinary FP-LD pumping light source differs from the constitution disclosed in FIG. 13 by not having the variable attenuators 40.

For example, when the desired pumping light wavelength of the two polarization multiplexing LDs (LD 1 and LD 2) is 1440 nm, due to manufacturing variations, at an LD temperature of 25° C., assume the wavelength of LD 1 is 1444 nm and the wavelength of LD 2 is 1436 nm. At this time, by lowering temperature of the LD 1 to 15° C. and raising the temperature of the LD 2 to 35° C., the pumping light wavelengths of LD 1 and LD 2 can both be brought to 1440 nm, the desired value. At this time, although the outputs from the LD 1 and the LD 2 generally vary, the pumping light power input to the PBC 42 can be set to the desired value by means of the variable attenuators 40.

Fifth Embodiment

In the present embodiment, the gain spectrum equalization method in the first embodiment explained with reference to FIG. 6 (that is, the method to flatten the net gain spectrum in the unit inline repeater interval without using a gain equalization filter) shall be described in detail.

Figure 14:
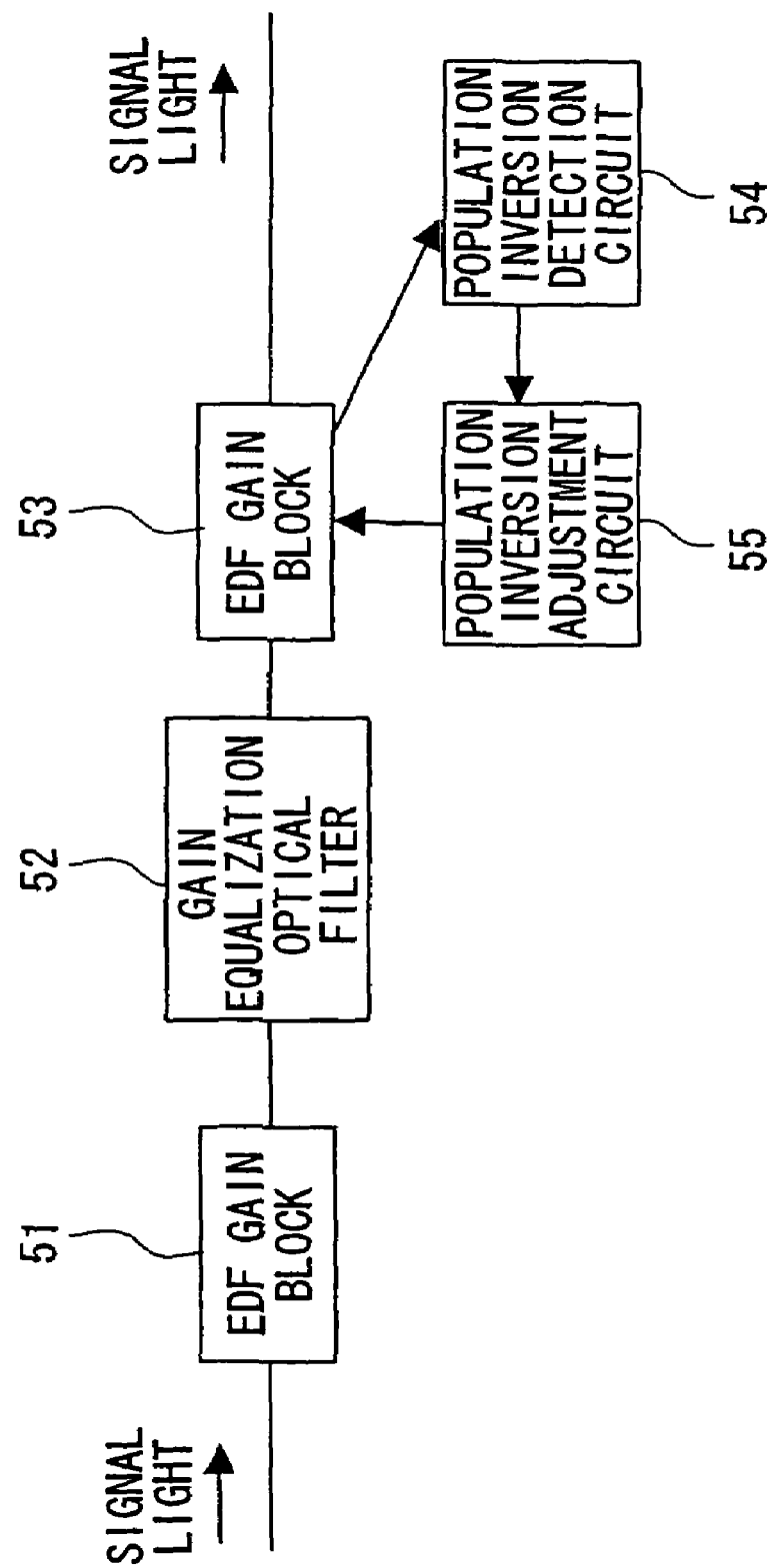
FIG. 14 is a drawing showing the constitution of the EDFA installed in an inline repeater in the fifth embodiment.

FIG. 14 shows an example of the constitution of the EDFAs 16, 26 disposed inside the inline repeaters 1-1, 1-2, respectively, shown in FIG. 1. Each EDFA comprises an EDF gain block 51 that is a first EDF gain block disposed on the input side of the signal light; an EDF gain block 53 that is a second EDF gain block disposed on the output side of the signal light; a gain equalization optical filter 52 that is disposed between the EDF gain block 51 and the EDF gain block 53; a population inversion detection circuit 54 that is connected to the EDF gain block 53 and measures the population inversion amount of the EDF (not illustrated) as the gain medium disposed in the EDF gain block 53; and a population inversion adjustment circuit 55 that is connected to the population inversion detection circuit 54. The population inversion adjustment circuit 55 alters the pumping light power to the EDF gain block 53 to adjust the pump state of the EDF gain block 53 so that the population inversion amount measured by the population inversion detection circuit 54 becomes the desired value.

The EDF gain block 51 may be omitted, and the gain equalization optical filter 52 may be disposed after the EDF gain block 53. Moreover, the means disclosed for example in Non-Patent Document 10 may be employed as the population inversion detection circuit 55.

Next, the operation of the present embodiment shall be described. The gain G, expressed in dB, of the EDF in the EDF gain block 53 is defined by the following equation:

$$G = A(S_{emi-tot} N_2 - S_{abs}) \qquad (3)$$

where A is a proportionality constant, $S_{emi}$ is the stimulated emission cross-section, $S_{ESA}$ is the excited state absorption cross-section, $S_{abs}$ is the absorption cross-section, $S_{emi-tot} = S_{emi} + S_{ESA}$ is the total stimulated emission cross-section, and $N_2$ is the excited-state filling factor.

Figure 15:
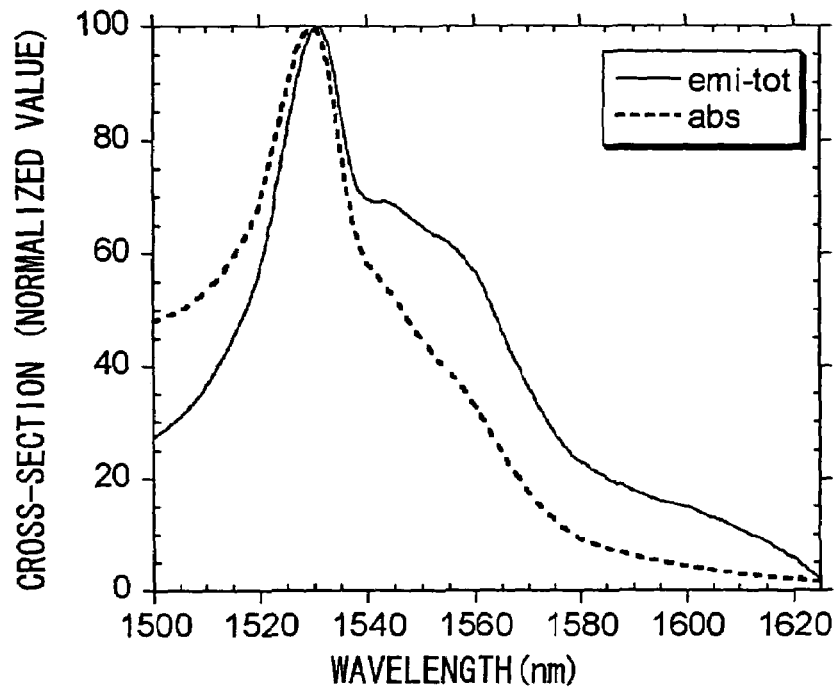
FIG. 15 is a graph showing the total stimulated emission cross-section $S_{emi\text{-}tot}$ and the absorption cross-section $S_{abs}$ spectra in the fifth embodiment.
Figure 16:
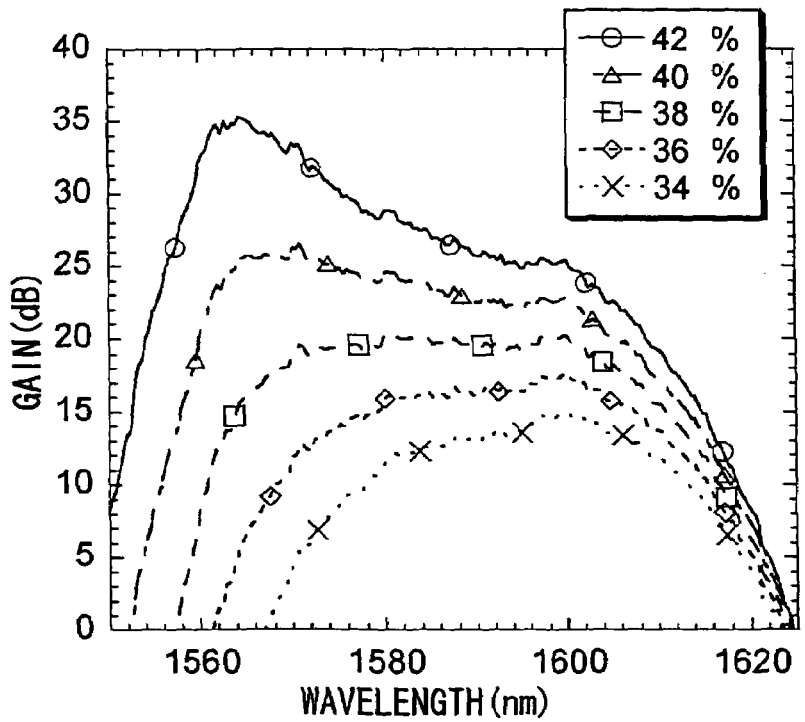
FIG. 16 is a graph showing changes in the gain spectra of the EDF in the EDF gain block 53 in the fifth embodiment.

FIG. 15 shows the spectra for the total stimulated emission cross-section $S_{emi\text{-}tot}$ and the absorption cross-section $S_{abs}$. The horizontal axis represents wavelength (nm), while the vertical axis represents cross-section (normalized value). In FIG. 15, the cross-section peak values are normalized to 100. FIG. 16 shows the gain spectra changes for the EDF in the EDF gain block 53 determined using Equation (3). The graph shows changes in the EDF gain spectrum for the cases of the excited-state filling factor $N_2$, which is the population inversion amount, being 42%, 40%, 38%, 36%, and 34%. In FIG. 16, the horizontal axis represents wavelength (nm), while the vertical axis represents gain (dB). As is clear from FIG. 16, the flat gain is approximately 20 dB in the L band when the excited-state filling factor $N_2$ is 38%. According to FIG. 16, the manner in which the gain spectrum changes in accordance with the value of the excited-state filling factor $N_2$ can be quantitatively determined.

Figure 17:
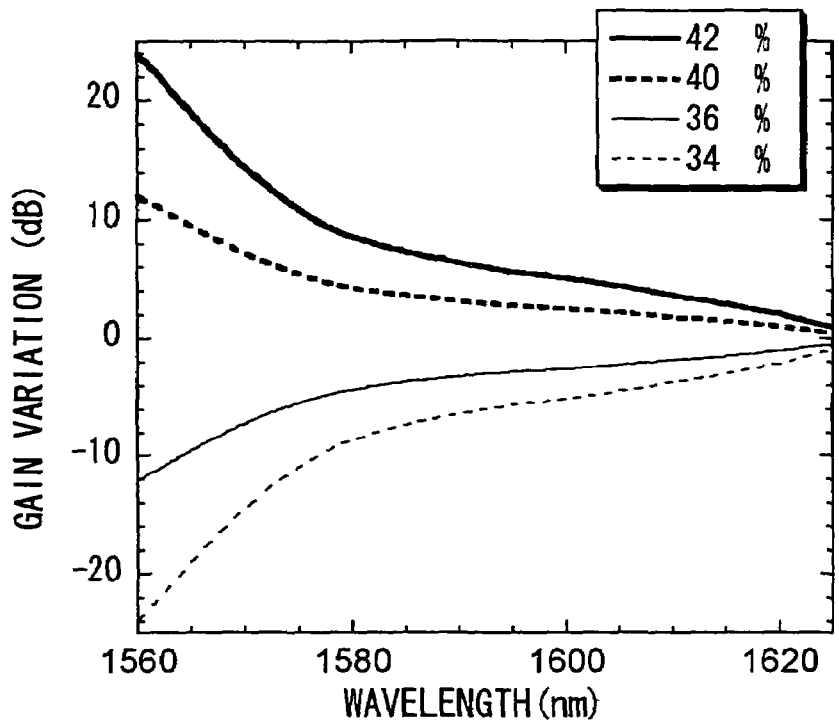
FIG. 17 is a graph showing gain variation spectra determined from FIG. 16, based on the case of the excited-state filling factor $N_2$ being 38% in the fifth embodiment.

FIG. 17 shows the gain variation spectra determined from FIG. 16. Specifically, FIG. 17 shows the gain variation spectra based on the case of the excited-state filling factor $N_2$ being 38% (that is, the case of the EDF gain spectrum being nearly flat in the signal light wavelength region). The horizontal axis represents wavelength (nm) and the vertical axis represents the gain variation (dB). With ΔG being the gain variation and $G(N_2)$ being the gain corresponding to the value of the excited-state filling factor $N_2$, then the following relation exists:

$$\Delta G = G(N_2) - G(N_2 = 38\%) \quad (4)$$

As is clear from FIG. 17, in relation to the signal light wavelength region of the L band, as the wavelength becomes shorter, the absolute value of the gain variation ΔG increases.

By using this characteristic of gain variation, while using EDFA that is used when not applying forward-pumped DRA, the Raman gain spectrum newly added by applying the forward-pumped DRA can be compensated by the EDF gain reduction in the EDF gain block 53.

Thereby, economical efficiency can be secured without newly providing an EDFA for performing gain compensation.

Figure 18:
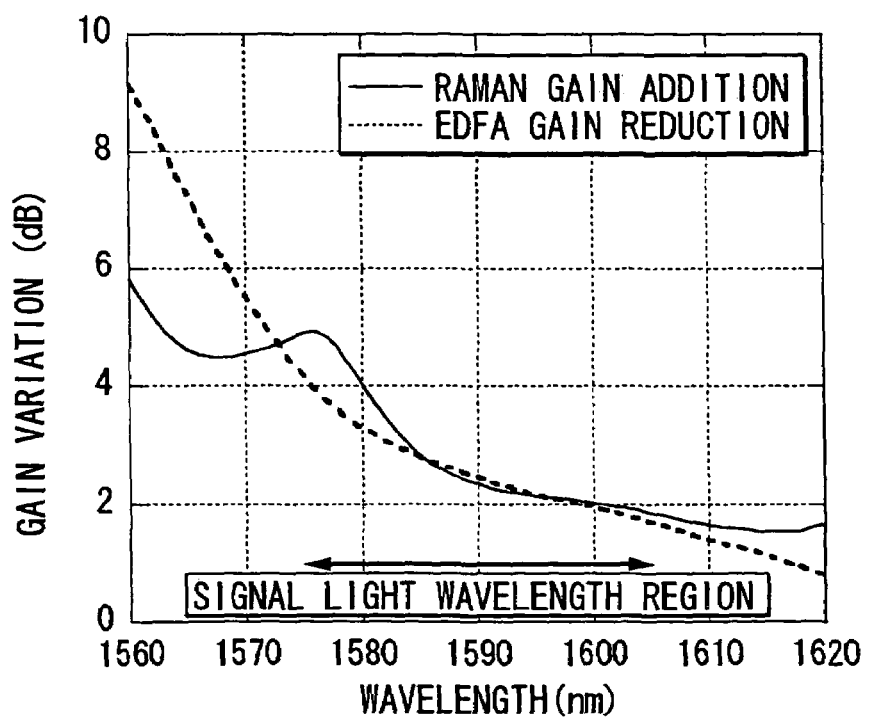
FIG. 18 is a graph that shows an example of the Raman gain spectrum in the case of the pumping light wavelength of the forward-pumped DRA being 1440 nm and the EDF gain reduction spectrum in the EDF gain block 53 that compensates the Raman gain spectrum in the fifth embodiment.

FIG. 18 shows an example of the Raman gain spectrum in the case of the pumping light wavelength of the forward-pumped DRA being 1440 nm ("Raman gain addition" in the drawing) and the EDF gain reduction spectrum in the EDF gain block 53 that compensates the Raman gain spectrum ("EDFA gain reduction" in the drawing). The horizontal axis represents wavelength (nm), while the vertical axis represents gain variation (dB). The excited-state filling factor $N_2$ of the EDF in the EDF gain block 53 was 36.5%.

From the graph it is clear that good agreement is achieved between both spectra within 1 dB in the signal wavelength region of 1575 to 1605 nm. Accordingly, in the constitution shown in, for example, FIG. 1, in relation to the total gain spectrum in an interval comprising one transmission path and one inline repeater (hereinafter referred to as the unit inline repeat interval), the Raman gain of the forward-pumped DRA can be spectrum equalized by the EDF gain in the EDF gain block 53.

The portion of non-agreement between the Raman gain of the forward-pumped DRA and the EDF gain in the EDF gain block 53 can be compensated by the gain equalization optical filter 52. When doing so, since the peak value of the loss spectrum in the gain equalization optical filter 52 is small, there is the advantage that degradation of the EDFA noise characteristics can be suppressed in the present embodiment. In other words, in the case of performing compensation with only the gain equalization optical filter 52 without using the method outlined in the present embodiment, since the peak value of the loss spectrum in the gain equalization optical filter 52 increases compared to the case of using the method of the present embodiment, the noise characteristics are degraded. By contrast, if the peak value of the loss spectrum in the gain equalization optical filter 52 is small as in the present embodiment, there is an advantage in terms of noise characteristics compared to the case of performing compensation with only the gain equalization optical filter 52.

The set value of the excited-state filling factor $N_2$ depends on the Raman gain value and the proportionality constant A in Equation (3). As shown in FIG. 18, the excited-state filling factor $N_2$ must be less than 38% in order to obtain EDF gain having a spectrum in which the gain in the short wavelength region of the L band is less than in the long wavelength region of the L band, and compensate Raman gain having a spectrum in which the gain in the short wavelength region of the L band is larger than the long wavelength region of the L band. A typical value of the excited-state filling factor $N_2$ is 34 to 37%.

Sixth Embodiment

The fourth embodiment gave operation parameter values in the present invention in the case of the transmission path being DSF. The present embodiment will give operation parameter values for the case of the transmission path being NZ-DSF.

In the present embodiment, the typical value of the zero-dispersion wavelength is 1500 nm, with the signal light wavelength being in the C band (1530 to 1560 nm). In the present embodiment as well as the first through fourth embodiments, the signal light wavelength consists of multiple wavelengths or channels of a wavelength-division multiplexed signal generally spaced over the entire band in those embodiments. In the case of the present embodiment, the wavelengths or channels of the wavelength-division multiplexed signal are disposed with, for example, 100-GHz spacing (that is, approximately 0.8 nm spacing) over the C band of 1530 to 1560 nm. At the initial stage of starting up the system, the multiple wavelengths of the signal light are disposed in a portion of the aforementioned band.

Similarly to the fourth embodiment, when the minimum value of a signal light wavelength is $\lambda_s$, the minimum value of a zero-dispersion wavelength is $\lambda_0$, and the maximum value of a pumping light wavelength is $\lambda_p$, the worst-case condition in which noise is at a maximum is defined as $2\lambda_0 - \lambda_s = \lambda_p$ (aforementioned Equation 1). In the present embodiment, when the zero-dispersion wavelength $\lambda_0$ is 1480 nm and the signal light wavelength $\lambda_s$ is 1560 nm, then the pumping light wavelength $\lambda_p$ is set to be less than 1385 nm in order to avoid the condition. That is, with the wavelength unit expressed in nm, $2\lambda_0 - \lambda_s > \lambda_p + 15$ (aforementioned Equation 2). The aforementioned values are approximate values in the case of the pumping light source being a single-wavelength FBG pumping light source.

Figure 19:
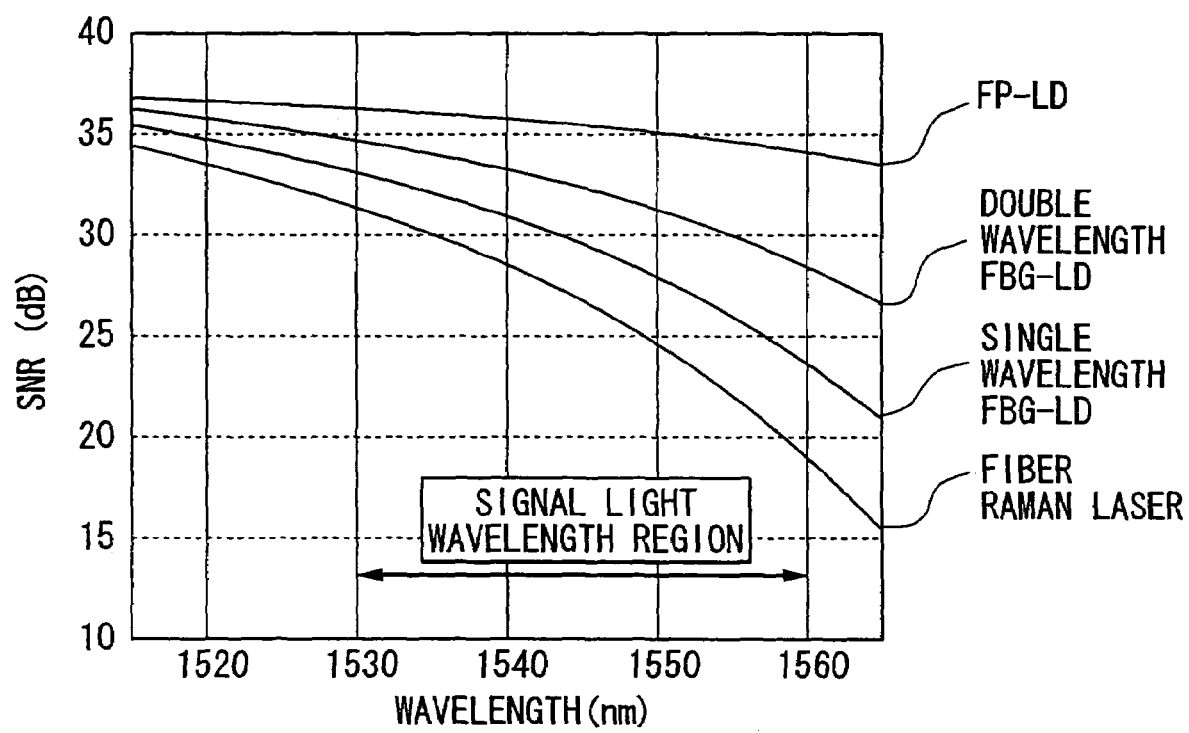
FIG. 19 is a graph that shows the SNR spectra for the same Raman gain in different pumping light sources according to the sixth embodiment.

Investigating cases of using pumping light sources other than a single-wavelength FBG pumping light source revealed the following. FIG. 19 shows the SNR spectra for the same Raman gain from different pumping light sources. In FIG. 19, the horizontal axis represents wavelength (nm) and the vertical axis represents SNR (dB). FIG. 19 shows the case of the pumping light wavelength $\lambda_p$ being 1385 nm. The different pumping light sources are, specifically, a fiber Raman laser, a single-wavelength FBG-LD, a double-wavelength FBG-LD, and a Fabry-Perot LD (FP-LD). As shown in FIG. 19, for a given wavelength the SNR increases in the order of the fiber Raman laser, single-wavelength FBG-LD, double-wavelength FBG-LD, and FP-LD.

When the signal light wavelength $\lambda s$ is 1560 nm and the pumping light wavelength $\lambda p$ is 1385 nm, the SNRs for the single-wavelength FBG-LD and the double-wavelength FBG-LD are, respectively, 23 dB and 28.5 dB. While the desired minimum value of the SNR spectrum depends on system conditions such as transmission distance and transmission rate, an example of a typical value is 25 dB. Accordingly, the pumping light wavelength $\lambda p$ in the case of the single-wavelength FBG-LD may be 1385 nm. For the double-wavelength FBG-LD, the wavelength shown in FIG. 19 can be shifted 5 nm to the long wavelength side, whereby the minimum value of the SNR spectrum becomes 27 dB with the signal light wavelength $\lambda s$ of 1560 nm and the pumping light wavelength $\lambda p$ of 1385 nm. Accordingly, when using the double-wavelength FBG-LD, equation to avoid the condition may be defined as $$2\lambda_0 - \lambda s > \lambda p + 10 \quad (5)$$

In addition, the number of wavelengths of the FBG-LD pumping light source may be three or more. Generally a higher number of wavelengths results in a higher SNR, provided the pumping light wavelength distribution width does not become excessively wide. This also applies to the fourth embodiment.

As stated above, the transmission path in the present embodiment is NZ-DSF, in which case, similarly to the second embodiment, the spectrum of the signal light power input to the NZ-DSF is made non-flat. In view of non-linear effects in the transmission path DSF, the further to the short wavelength side in which the Raman gain is large, the lower the signal light power.

Summary of First through Sixth Embodiments

The optical fiber communication system according to the embodiments of the present invention has an inline repeater described in the first through sixth embodiments, and is implemented by laying the silica fibers 10, 11, 20, and 21 throughout a city as a transmission path DSF.

Seventh Embodiment

A distributed amplification medium such as a transmission path fiber in which DSF and NZ-DSF are installed throughout a city as described in the first embodiment may be replaced by a lumped amplification medium in which silica fiber is wound around a bobbin or the like. In this case, the optical fiber communication system can be viewed as an optical amplifier. This optical amplifier can be used in an inline repeater, a transmitter, or a receiver. The present embodiment relates to such an optical amplifier.

Figure 20:
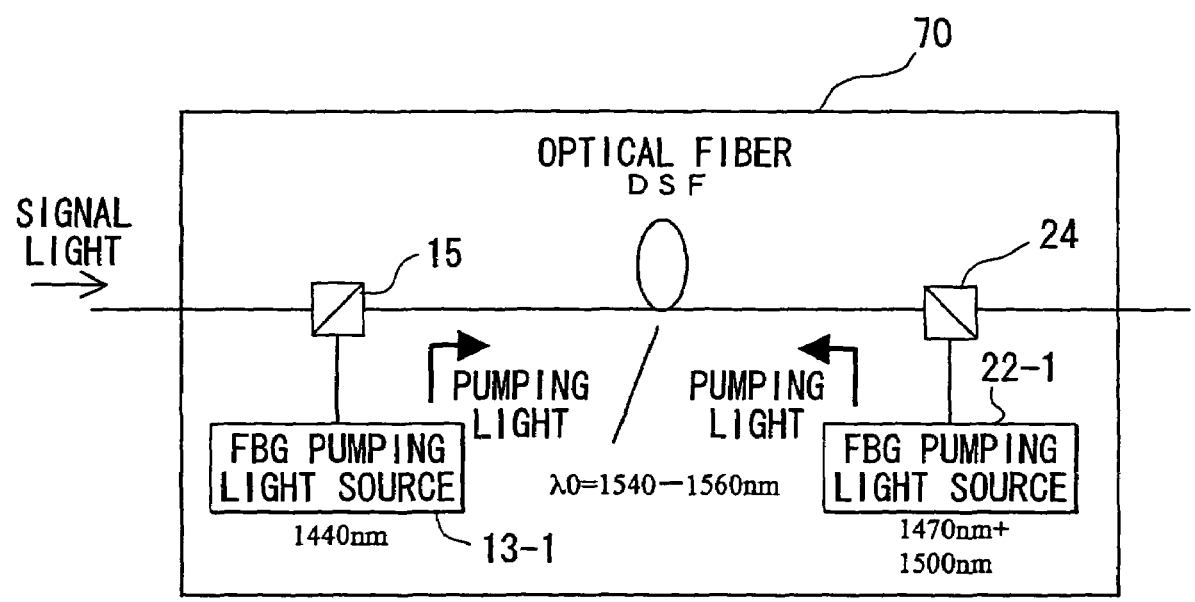
FIG. 20 is a drawing that shows the constitution of the optical amplifier according to the seventh embodiment.

FIG. 20 shows the constitution of the optical amplifier according to the present embodiment. Constituent elements identical to those described in FIG. 1 are given the same reference symbols, with a description thereof omitted. Optical amplifier 70 employs DSF as the medium of lumped optical amplification, with its length being, for example, 10 km. The DSF is wound on a bobbin. The pumping light sources used for backward Raman amplification and forward Raman amplification for the DSF are the FBG pumping light sources 22-1 and 13-1 having the same wavelengths as the first embodiment.

The present embodiment can amplify the signal light input to the optical amplifier 70 free of signal quality degradation by RIN transfer and ND-FWM.

The constitution of the present embodiment was described in correspondence to the first embodiment, but also applies to the embodiments other than the first embodiment.

While embodiments of the present invention have been described and illustrated above with reference to the drawings, it should be understood that these are exemplary of the invention and are not to be considered as limiting. Therefore, additions, omissions, substitutions, and other modifications can be made without departing from the spirit or scope of the present invention.

INDUSTRIAL APPLICABILITY

Since the present invention solves the shortcoming of signal light quality degradation due to RIN transfer and ND-FWM that was a problem in the prior art, it can realize high communication signal quality at a low cost.

The invention claimed is:
1. An optical fiber communication system comprising:
   silica fiber laid throughout a city as a gain medium for Raman amplification to amplify a signal light;
   a pumping light source that emits a forward pumping light with a plurality of wavelengths that co-propagates through the silica fiber in the same direction as the signal light and pumps the signal light; and
   a multiplexer disposed between the silica fiber and the pumping light source that multiplexes the signal light and the pumping light,
   wherein the multiplexer is provided with a means to multiplex the signal light input thereto having a wavelength longer than the zero-dispersion wavelength of the silica fiber and the pumping light emitted from the pumping light source,
   the pumping light source is equipped with a means to emit forward pumping light, with the longest wavelength of the pumping light being shorter than the shortest wavelength of the signal light so as to have a frequency difference of 13.7 to 17.9 THz,
   the silica fiber is a dispersion-shifted fiber, and the signal light comprises a plurality of wavelengths in the L band, and
   the optical fiber communication system has an erbium-doped fiber amplifier having:
   an erbium-doped fiber gain block provided with erbium-doped fiber as a gain medium;
   a gain equalization optical filter disposed before or after the erbium-doped fiber gain block;
   a population inversion detection circuit that measures a population inversion amount in the erbium-doped fiber; and
   a population inversion adjustment circuit that controls the erbium-doped fiber gain block so that the population inversion amount measured by the population inversion detection circuit is a prescribed value.

2. The optical fiber communication system in accordance with claim 1, wherein the excited-state filling factor $N_2$ of the erbium-doped fiber is less than 38%.

3. An optical fiber communication system comprising:
   silica fiber laid throughout a city as a gain medium for Raman amplification to amplify a signal light;
   a pumping light source that emits a forward pumping light with a plurality of wavelengths that co-propagates through the silica fiber in the same direction as the signal light and pumps the signal light; and
   a multiplexer disposed between the silica fiber and the pumping light source that multiplexes the signal light and the pumping light,
   wherein the multiplexer is provided with a means to multiplex the signal light input thereto having a wavelength longer than the zero-dispersion wavelength of the silica fiber and the pumping light emitted from the pumping light source, the pumping light source is equipped with a means to emit forward pumping light, with the longest wavelength of the pumping light being shorter than the shortest wavelength of the signal light so as to have a frequency difference of 13.7 to 17.9 THz, the silica fiber is a non-zero dispersion-shifted fiber, and the signal light comprises a plurality of wavelengths in the C band, and the optical fiber communication system has an erbium-doped fiber amplifier having:

an erbium-doped fiber gain block provided with erbium-doped fiber as a gain medium;

a gain equalization optical filter disposed before or after the erbium-doped fiber gain block;

a population inversion detection circuit that measures a population inversion amount in the erbium-doped fiber; and a population inversion adjustment circuit that controls the erbium-doped fiber gain block so that the population inversion amount measured by the population inversion detection circuit is a prescribed value.

4. The optical fiber communication system in accordance with claim 3, wherein the excited-state filling factor $N_2$ of the erbium-doped fiber is less than 38%.

* * * * *